United States Patent [19]

Flory

[11] Patent Number: 4,897,722

[45] Date of Patent: Jan. 30, 1990

[54] WIDESCREEN TELEVISION TRANSMISSION SYSTEM UTILIZING CONVENTIONAL EQUIPMENT INCLUDING A CAMERA AND VCR

[75] Inventor: Robert E. Flory, Princeton, N.J.

[73] Assignee: General Electric Company, Princeton, N.J.

[21] Appl. No.: 178,954

[22] Filed: Apr. 7, 1988

[51] Int. Cl.⁴ .............................................. H04N 7/04
[52] U.S. Cl. ..................................... 358/141; 358/180
[58] Field of Search ................................ 358/180, 141

[56] References Cited

U.S. PATENT DOCUMENTS

| | | | |
|---|---|---|---|
| 3,097,262 | 7/1963 | Ehrenhaft | 358/180 |
| 4,385,324 | 5/1983 | Shioda et al. | 358/180 |
| 4,394,690 | 7/1983 | Kobayashi | 358/180 |
| 4,816,899 | 3/1989 | Strolle et al. | 358/12 |

OTHER PUBLICATIONS

"Encoding for Compatibility and Recoverability in the ACTV System" by M. A. Isnardi, IEEE Transactions on Broadcasting, vol. BC-33, No. 4, Dec. 1987.
"Decoding Issues in the ACTV System", by M. A. Isnardi et al., IEEE Transactions on Consumer Electronics, vol. 34, No. 1, Feb. 1988.

Primary Examiner—John Shepperd
Attorney, Agent, or Firm—Joseph S. Tripoli; Peter M. Emanuel

[57] ABSTRACT

A widescreen enhanced definition television system compatible with an existing television standard (e.g., NTSC) has provisions for utilizing a conventional television camera. The conventional camera is modified by replacing the conventional lens with an anamorphic lens or by modifying the scanning control signals to produce a widescreen television signal corresponding images with a widescreen aspect ratio (e.g., 5:3) greater than the conventional aspect ratio (e.g., 4:3). The widescreen television signal produced by the modified camera is coupled to an encoder without restriction of horizontal bandwidth required to conform to the existing television standard. The encoder produces a television signal encoded with components for producing widescreen images with enhanced horizontal resolution when processed by a widescreen receiver but suitable for transmission within a single transmission channel of the existing television standard. When processed by a conventional receiver, due to the nature of the encoding, an image with the conventional aspect ratio but, without significant artifacts is produced.

9 Claims, 12 Drawing Sheets

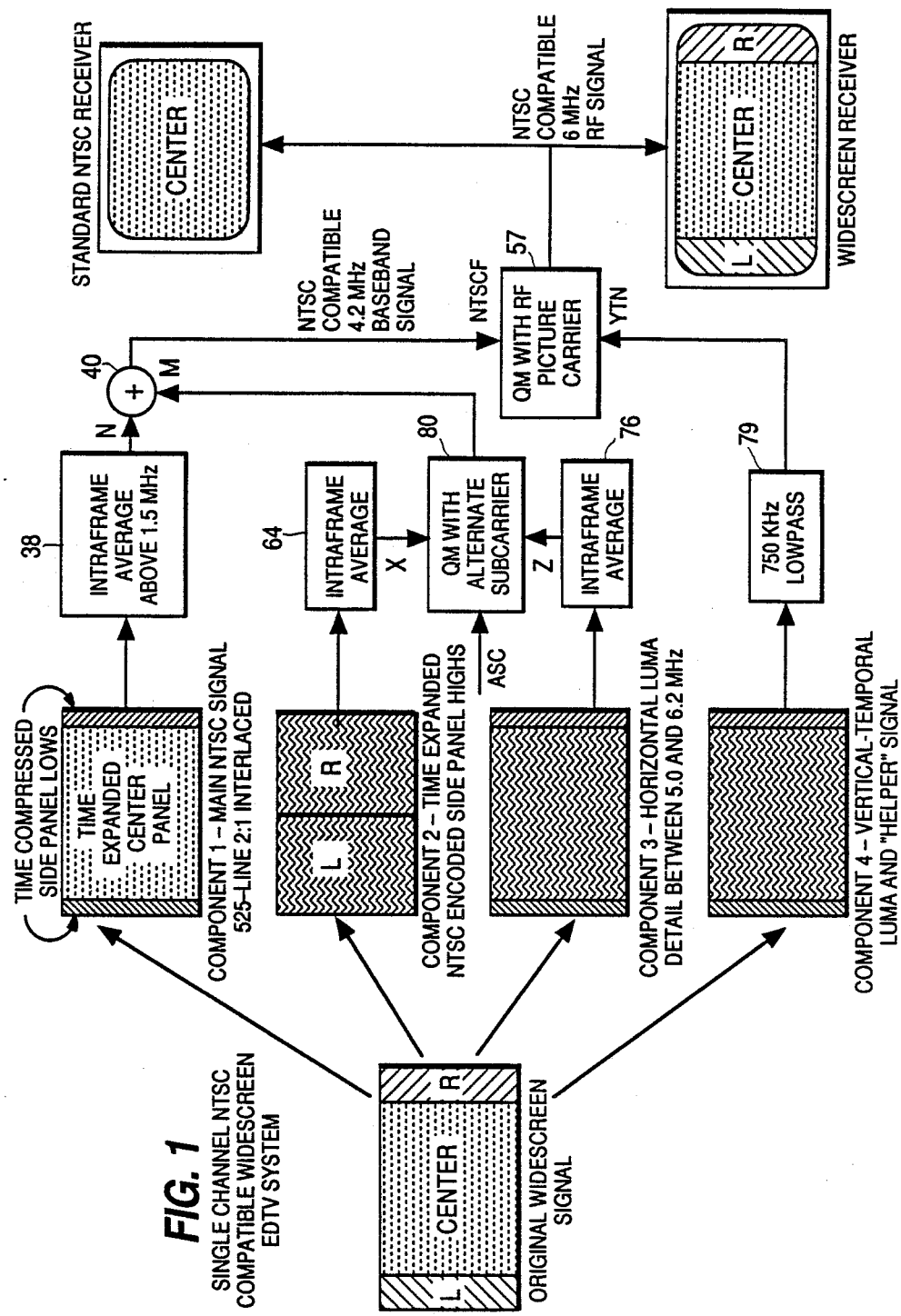

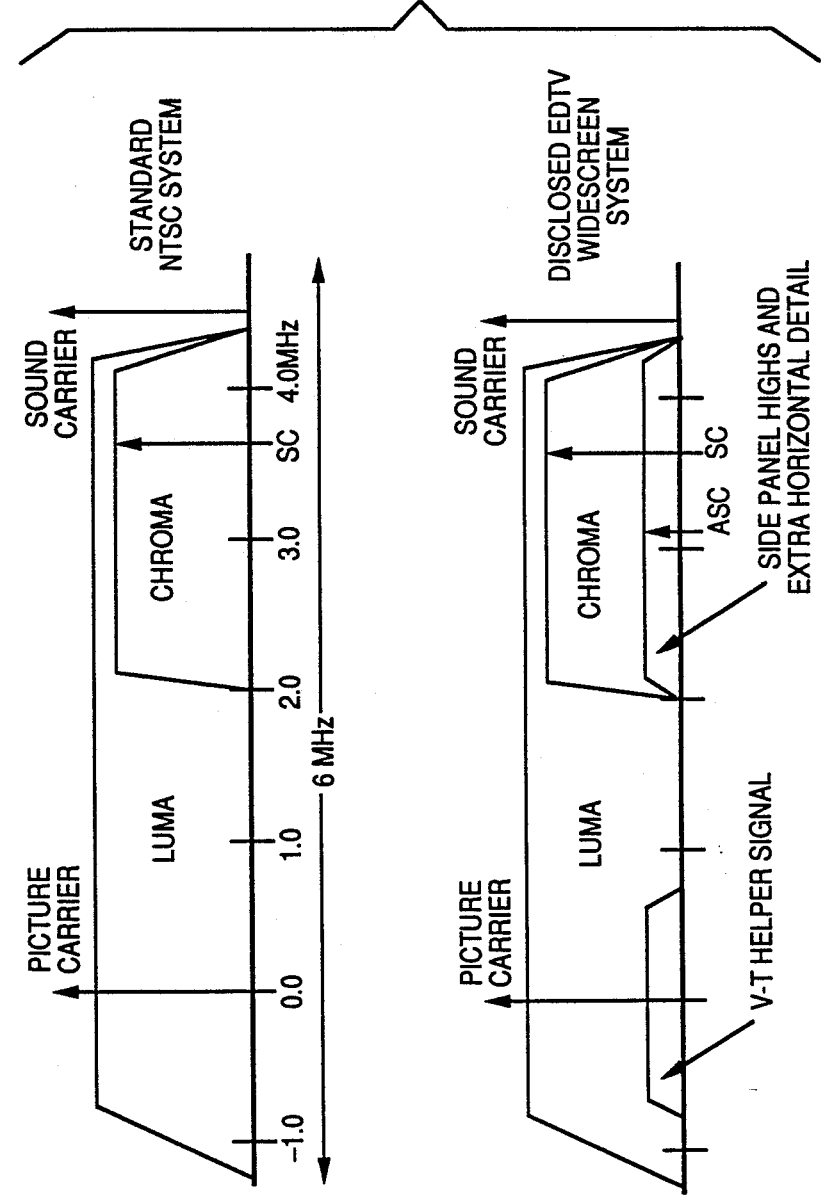

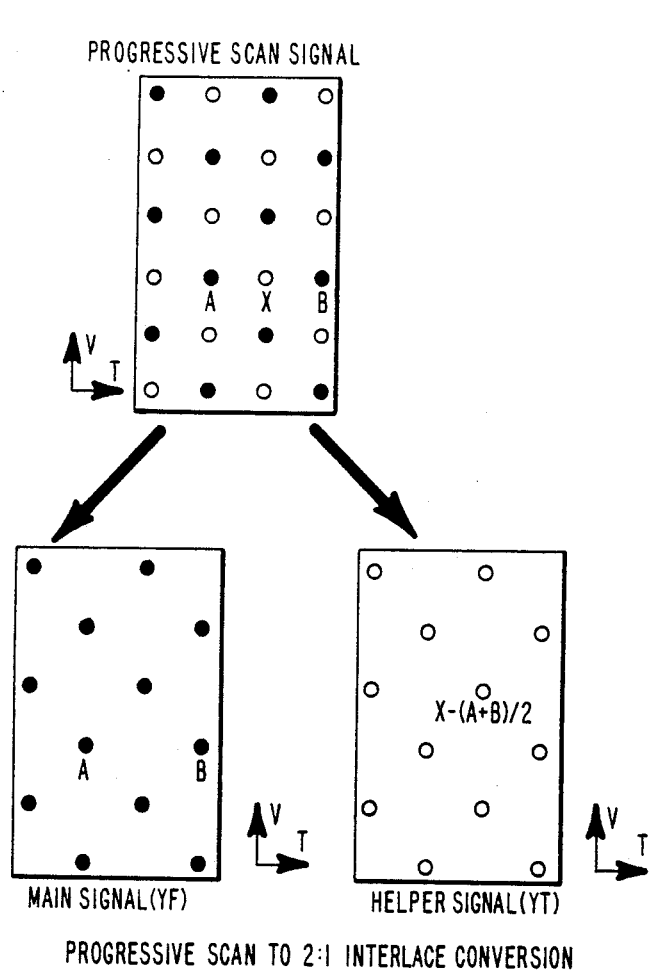

WIDESCREEN TELEVISION TRANSMISSION SYSTEM UTILIZING CONVENTIONAL EQUIPMENT INCLUDING A CAMERA AND VCR

FIELD OF THE INVENTION

The present invention concerns an arrangement for utilizing a conventional television camera, normally intended to generate a conventional television signal conforming to a conventional transmission standard (e.g., NTSC) for reproducing images with a conventional aspect ratio such as 4:3, in a widescreen television system for producing a television signal corresponding to a greater aspect ratio such as 5:3.

BACKGROUND OF THE INVENTION

Recently a great deal of interest has been expressed in television systems which provide an image aspect ratio (i.e., the ratio of the width to the height of the image) such as 2:1, 16:9 or 5:3 greater than the conventional aspect ratio of 4:3 of present day conventional television systems conforming to a conventional transmission standard such as NTSC. The greater aspect ratios are more in-line wth human visual perception than the conventional 4:3 television aspect ratio. Accordingly, present day motion picture films produce images with an aspect ratio of 5:3 or greater.

It is desirable that a new transmission system for providing a widescreen television signal for reproducing widescreen images in widescreen television receivers will also be compatible with the existing conventional transmission standard and existing conventional television receivers. This means that the widescreen television signal should be capable of being transmitted through a single channel of a conventional transmission system having a limited transmission bandwidth (e.g., 6 MHz for NTSC) and also that when the widescreen television signal is processed in a conventional aspect ratio receiver a conventional aspect ratio image should be produced without significant degradation or artifacts.

One "backward compatible" widescreen television transmission system is described in U.S. patent application Ser. No. 078,150, entitled "Compatible Widescreen Television System", filed in the U. S. Patent and Trademark Office on July 27, 1987 in the names of C. H. Strolle, T. R. Smith, B. J. Roeder and M. A. Isnardi, and issued as U.S. Pat. No. 4,816,899 on Mar. 28, 1989. This system utilizes a widescreen television camera that is capable of scanning a scene so as to generate a widescreen television signal corresponding to an image having a widescreen aspect ratio (e.g., 5:3) greater than the conventional aspect ratio (e.g., 4:3) available from a conventional camera. The widescreen television signal has an active line interval containing the widescreen image information which is the same as an active line interval of a conventional aspect ratio television signal employed in the conventional transmission system (e.g., approximately 52.5 microseconds for NTSC).

If an image were reproduced in a conventional television receiver from the widescreen television signal in the form generated by the widescreen camera, the image would be compressed in time so that objects would appear thinner in the horizontal direction than normal. The widescreen television signal in the form generated by a widescreen camera also has a bandwidth which is greater than that of a conventional aspect ratio television signal generated by a conventional camera and can therefore not be transmitted in a single channel of the conventional transmission system without loss of information necessary for faithful reproduction of a widescreen image in a widescreen television receiver.

To solve these problems, the widescreen television system described in the Strolle et al. patent application utilizes an encoder to process the widescreen television signal produced by the widescreen camera prior to transmission to produce a television signal which contains information necessary for faithful widescreen image reproduction and which is also compatible with the conventional NTSC transmission system. When the compatible widescreen television signal is received and processed by a widescreen television receiver, a widescreen image is produced. When received and processed by a conventional aspect ratio television receiver, a conventional aspect ratio image without significant degradation or artifacts is produced.

Basically, the encoder expands in time portions of the widescreen television signal corresponding to a center image portion between left and right side image portions of the widescreen image. This is done so that a compressed image is not produced in a conventional television receiver and so that the bandwidth is reduced for transmission to a widescreen television receiver through a single conventional transmission channel without loss of information. The encoder also compresses in time the portions of the widescreen television signal corresponding to the left and right side widescreen image portions into image overscan regions so as not to be visible in the image displayed by a conventional aspect ratio television receiver. The time compression of the side signal portions causes an increase in bandwidth. To accommodate the increase in bandwidth, the side signal portions are partitioned in frequency into low and high frequency components. The low frequency component of time-compressed side signal portions are combined with the time-expanded center signal portion to form a first component of the transmitted signal. The high frequency component of the time-compressed side signal portions are modulated on a subcarrier to form a second component of the transmitted signal.

An improved "backward compatible" widescreen television system, which also provides for enhanced or extended definition images with greater than conventional horizontal and vertical image detail, is described in U.S. patent application 139,340, entitled "Extended Definition Widescreen Television Signal Processing System", filed in the U.S. Patent and Trademark Office on Dec. 29, 1987 in the name of M. A. Isnardi, and wall allowed on May 16, 1989.

The widescreen enhanced definition system is intended to use a widescreen high definition television camera that scans a scene so as to produce a television signal corresponding to an image having: a widescreen aspect ratio (e.g., 5:3) greater than the conventional aspect ratio (e.g., 4:3) available from a conventional camera; a high definition horizontal resolution (e.g., between 600 and 800 lines) greater than the conventional horizontal resolution (e.g., between 400 and 600 lines) available from a conventional camera; and a high definition vertical resolution (e.g., 1050 lines per frame) greater than the conventional vertical resolution (e.g., 525 lines per frame) available from a conventional camera. The resulting widescreen high definition television signal has a much greater bandwidth than the conventional television signal produced by a conventional camera and is reduced in bandwidth by an encoder (as will be described below in detail in connection with a detailed description of embodiments of the present invention) to produce a television signal capable of being transmitted in a single conventional channel having a limited bandwidth. Briefly, the encoded signal includes four components. The first and second components are similar to the first and second components of the widescreen television system described in the Strolle et al. patent application. The third component contains high frequency horizontal image detail for use in a widescreen enhanced definition television receiver to produce an increase in horizontal resolution. The fouth component contains information for use in a widescreen enhanced definition television receiver to reconstruct vertical detail which may otherwise be lost due to encoding process.

SUMMARY OF THE INVENTION

At present, widescreen high definition television cameras are very expensive compared to conventional television cameras. In addition, new video tape systems are required to record the exceptionally large bandwidth widescreen high definition television signals produced by a widescreen high definition cameras. Such reasons may be an impediment to some broadcasters, especially to those operating small local broadcast stations, in providing widescreen enhanced definition television transmissions. Accordingly, the present inventor has recognized a need for and has devised an arrangement enabling a conventional television camera and a conventional video tape system to be employed in a widescreen enhanced definition transmission system of the type described in the Isnardi patent application. The devised arrangement, to be described below in detail, permits broadcasters to immediately provide widescreen television transmissions with at least enhanced horizontal resolution at a reasonable initial cost and to upgrade the system for full widescreen enhanced definition transmission at a future date.

In accordance with an aspect of the present invention, a conventional television camera intended to produce a television signal conforming to an existing conventional television transmission standard (e.g., NTSC) for producing images with a conventional aspect ratio (e.g., 4:3) when processed in a conventional television receiver is modified, e.g., by replacing the conventional lens with an anamorphic lens or by changing the scanning deflection waveforms, to produce a television signal corresponding to a widescreen aspect ratio (e.g., 5:3) image. The widescreen television signal produced by the modified camera is coupled to an input of an encoder of the type described in the Isnardi et al. application without the horizontal bandwidth restriction required for the conventional transmission standard. A conventional video tape system may be used to record the widescreen television signal produced by the modified camera before coupling to the encoder. The encoder processes the widescreen signal to produce a television signal encoded with components for producing widescreen images with enhanced horizontal resolution when processed in a widescreen television receiver but suitable for transmission within a single channel of the conventional television transmission standard. When the transmitted signal is processed by a conventional television receiver, due to the nature of the encoding, a conventional aspect ratio image (with conventional horizontal resolution) is produced.

BRIEF DESCRIPTION OF THE DRAWING

The invention will be described in detail with reference to the accompanying Drawing in which:

FIGS. 1b–1e contain diagrams helpful in understanding the operation of the encoder system shown in FIGS. 1 and 1a;

FIGS. 2–5 depict signal waveforms and diagrams helpful in understanding the operation of the encoder system shown in FIGS. 1 and 1a;

FIGS. 1a-1 and 1a-2 show block diagrams of modifications of the encoder shown in FIGS. 1 and 1a in accordance with the present invention.

FIGS. 1, 1a–1e, 2–6 relate to the widescreen EDTV described in the Isnardi patent application, which discloses details of certain blocks of FIGS. 1, 1a and 6 and is therefore incorporated by reference. FIGS. 1a-1 and 1a-2 relate to the present invention.

Corresponding elements shown in various FIGURES are identified by the same reference number.

DETAILED DESCRIPTION OF THE DRAWING

A system intended to transmit wide aspect ratio pictures, e.g., 5:3, through a standard, e.g., NTSC, broadcast channel should achieve a high quality picture display by a widescreen receiver, while greatly reducing or eliminating observable degradations in a standard 4:3 aspect ratio display. The use of signal compression techniques on the side panels of a picture takes advantage of the horizontal overscan region of a standard NTSC television receiver display, but may sacrifice image resolution in the side panel regions of a reconstructed widescreen picture. Since compression in time results in an expansion in the frequency domain, only low frequency components would survive processing in a standard television channel, which exhibits a smaller bandwidth compared with that required for a widescreen signal. Thus, when the compressed side panels of a compatible widescreen signal are expanded in a widescreen receiver, there results a noticeable difference between the resolution or high frequency content of the center portion of a displayed widescreen picture and the side panels, unless steps are taken to avoid this effect. This noticeable difference is due to the fact that low frequency side panel information would be recovered, but high frequency information would be lost due to video channel bandlimiting effects.

Figure 1A:
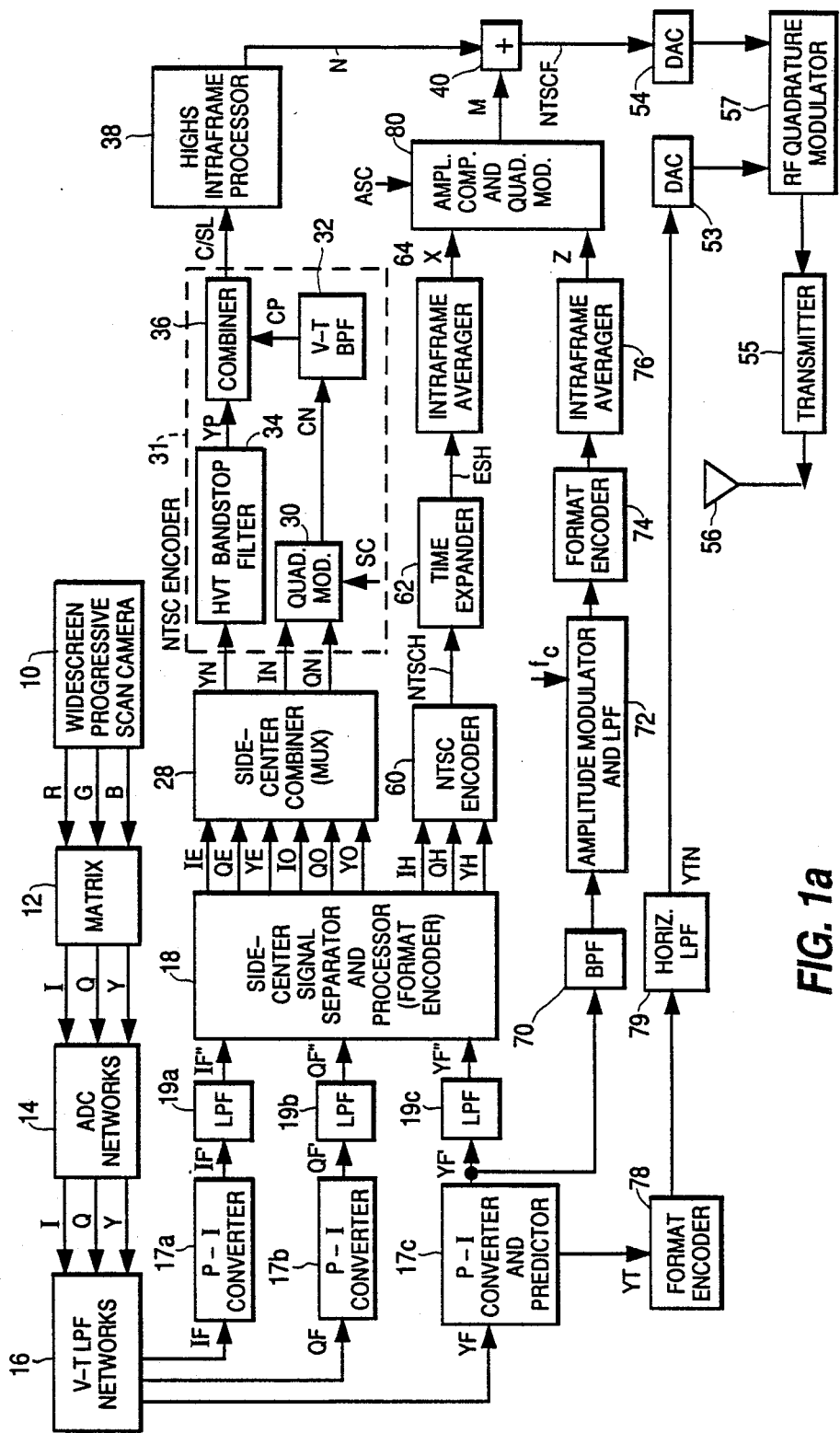
FIG. 1a shows a detailed block diagram of the encoder system shown in FIG. 1.
Figure 1C:
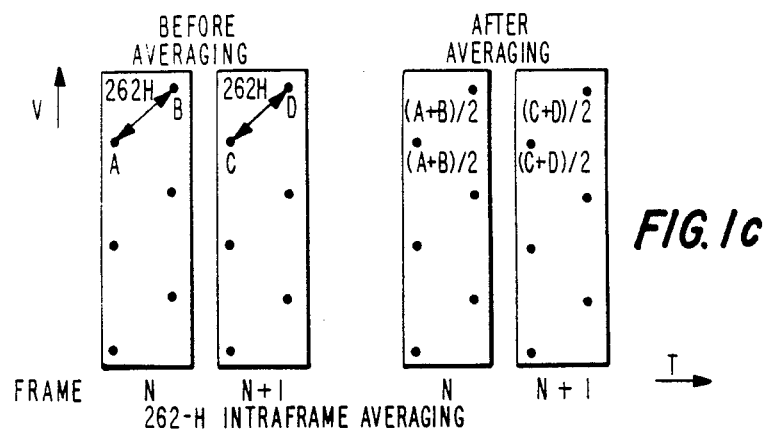
Figure 1D:
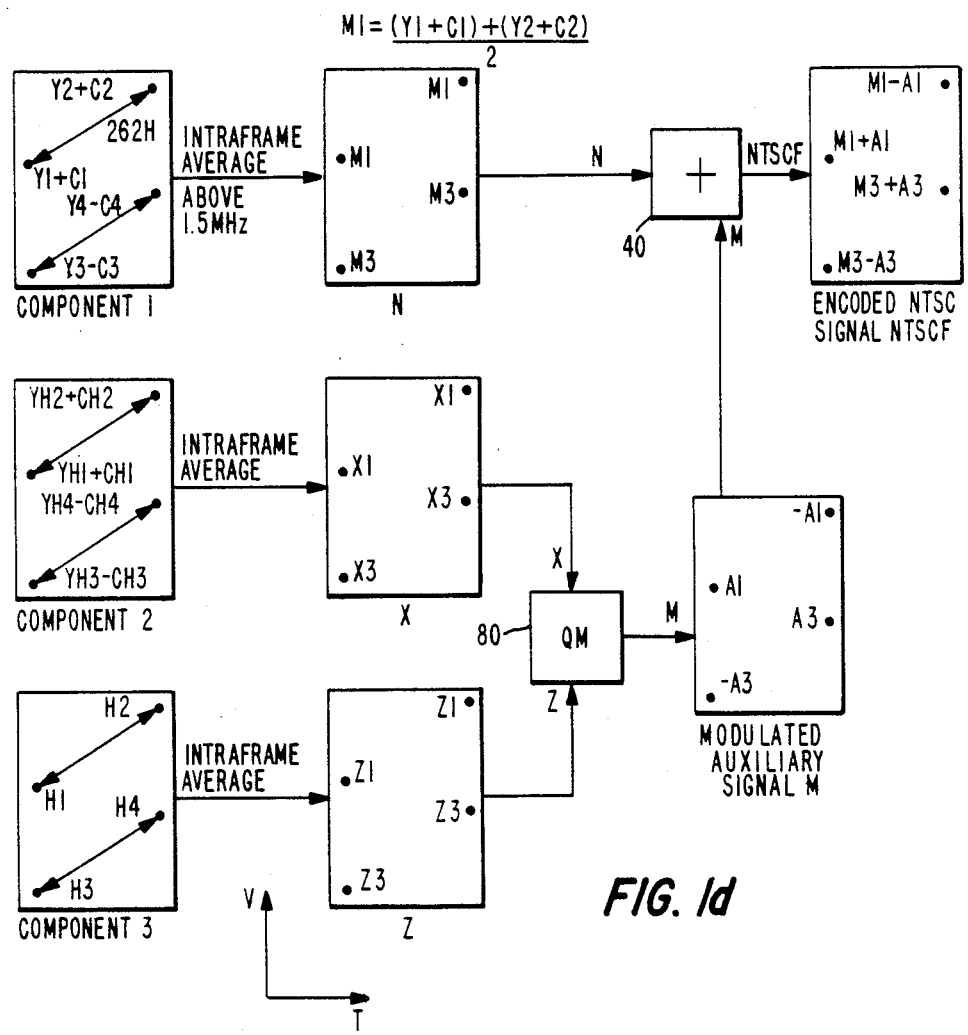
Figure 1E:
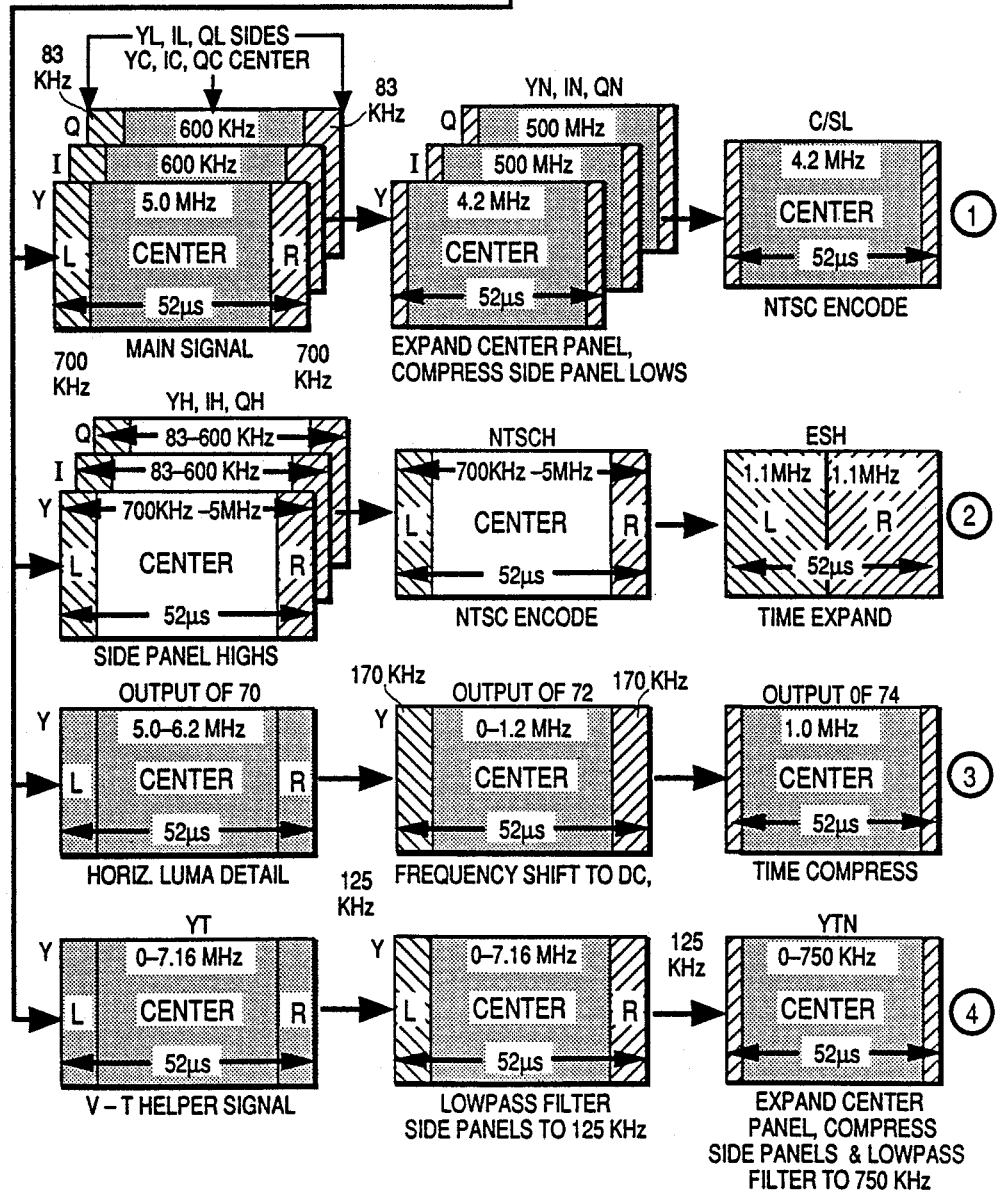
Figures 1, 1A:
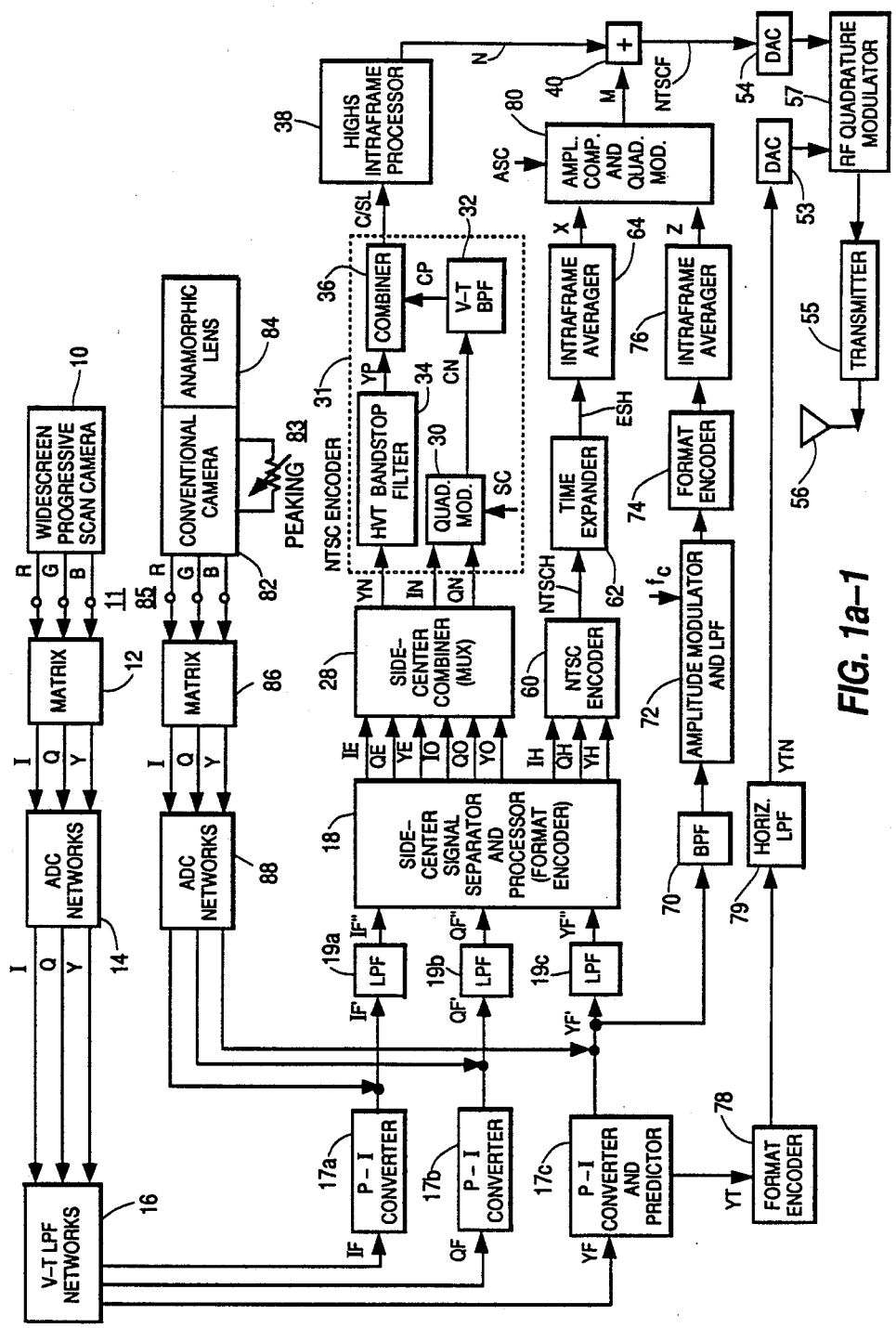
FIG. 1 illustrates a general overview of a compatible widescreen enhanced definition television (EDTV) encoder system.
Figures 1, 1A, 2:
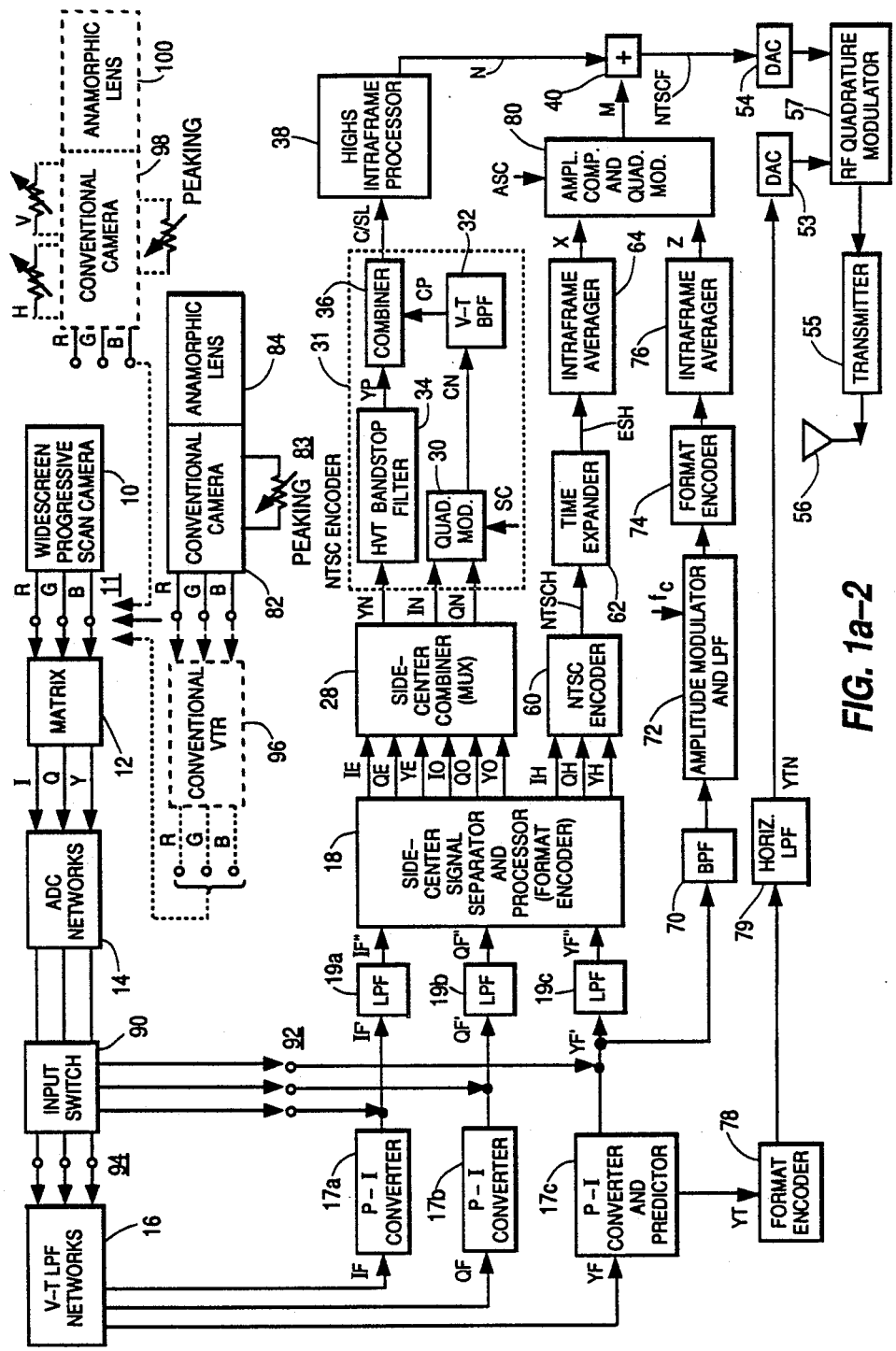

As is indicated in FIG. 1, a widescreen high definition television signal having left, right and center panel signal portions corresponding to respective image portions is processed so as to develop four separate encoding components. The four components are processed separately before being recombined in a single signal transmission channel.

A first component is a main 2:1 interlaced signal with a standard 4:3 aspect ratio. This component comprises a central portion of the widescreen signal that has been time expanded to occupy nearly the entire 4:3 aspect ratio active line time, and side panel horizontal low frequency information that has been time compressed into the left and right horizontal image overscan regions where such information is hidden from view in a standard television receiver display.

A second component is an auxiliary 2:1 interlaced signal comprising left and right side panel high frequency information that have each been time expanded to half the active line time. Thus expanded side panel information occupies substantially the entire active line time.

A third component is an auxiliary 2:1 interlaced signal, derived from the widescreen signal source, comprising high frequency horizontal luminance detail information between approximately 5.0 MHz and 6.2 MHz.

A fourth component is an auxiliary 2:1 interlaced "helper" signal comprising vertical-temporal (V-T) luminance detail information that would otherwise be lost in the conversion from progressive scan to interlaced format. This signal component helps to reconstruct missing image information and to reduce or eliminate unwanted flicker and motion artifacts at a widescreen EDTV receiver.

At a widescreen EDTV receiver, a composite signal containing the described four components is decoded into the constituent four components. The decoded components are processed separately and used to develop an image representative widescreen signal with enhanced resolution.

Processing of the first component (containing time expanded center portion information and time compressed side portion low frequency information) is such that the resulting luminance bandwidth does not exceed the NTSC luminance bandwidth of 4.2 MHz in this example. This signal is color encoded in standard NTSC format, and the luminance and chrominance components of this signal are suitably pre-filtered (e.g., using field comb filters) to provide improved luminance-chrominance separation at both standard NTSC and widescreen receivers.

The time expansion of the second component (side panel high frequency information) reduces its horizontal bandwidth to about 1.1 MHz. This component is spatially uncorrelated with the main signal (the first component), and special precautions are taken to mask its visibility on standard NTSC receivers, as will be discussed.

The 5.0 to 6.2 MHz extended high-frequency luminance information content of the third component is first shifted downward in frequency to a frequency range of 0 to 1.2 MHz before further processing. This component is mapped into the standard 4:3 format, which spatially correlates it with the main signal (the first component) to mask its visibility on standard NTSC receivers. The compressed side panel information of the third component exhibits a bandwidth which is one-sixth that of the center information (0–1.2 MHz).

The fourth component (vertical-temporal helper) is mapped into standard 4:3 format to correlate it with the main signal component to thereby mask its visibility on standard NTSC receivers and is horizontally bandwidth limited to 750 KHz.

The first, second, and third components are processed by respective intraframe averagers 38, 64, and 76 (a type of vertical-temporal (V-T) filter) to eliminate V-T crosstalk between the main and auxiliary signal components at a widescreen receiver. The first component is intra-frame averaged only above approximately 1.5 MHz. The second and third intraframe averaged components, identified as X and Z, are non-linearly amplitude compressed prior to quadrature modulating a 3.108 MHz alternate subcarrier ASC, having a phase which alternates from field to field, unlike that of a chrominance subcarrier, in a block 80. A modulated signal (M) from block 80 is added to the intraframe averaged first component (N) in an adder 40. A resulting output signal is a 4.2 MHz bandwidth baseband signal (NTSCF) that, together with a 750 KHz low pass filtered fourth component (YTN) from a filter 79, quadrature modulates an RF picture carrier in a block 57 to produce an NTSC compatible RF signal which can be transmitted to a standard NTSC receiver or a widescreen progressive scan receiver via a single, standard bandwidth, broadcast channel.

As will be seen from the encoder of FIG. 1a, the use of time compression on the first component allows low frequency side panel information to be squeezed entirely into the horizontal overscan region of a standard NTSC signal. The high frequency side panel information is spectrally shared with the standard NTSC signal through the video transmission channel, in a manner transparent to a standard receiver, through the use of an alternate subcarrier quadrature modulation technique involving block 80 as will be discussed. When received by a standard NTSC receiver, only the center panel portion of the main signal (the first component) is seen. The second and third components may create a low amplitude interference pattern that is not perceived at normal viewing distances and at normal picture control settings. The fourth component is removed completely in receivers with synchronous video detectors. In receivers with envelope detectors, the fourth component is processed but not perceived because it is correlated with the main signal.

FIG. 1b illustrates the RF spectrum of the disclosed EDTV widescreen system, including the auxiliary information, compared to the RF spectrum of a standard NTSC system. In the spectrum of the disclosed system the side panel highs and the extra high frequency horizontal luminance detail information extend approximately 1.1 MHz on either side of the 3.108 MHz alternate subcarrier (ASC) frequency. The V-T helper signal information (component 4) extends 750 KHz on either side of the main signal picture carrier frequency.

A widescreen high definition receiver includes apparatus for reconstructing the original widescreen high definition signal. Compared to a standard NTSC signal, the reconstructed widescreen signal has left and right side panels with standard NTSC resolution, and a 4:3 aspect ratio center panel with superior horizontal and vertical luminance detail particularly in stationary portions of an image.

Two basic considerations govern the signal processing technique associated with the development and processing of the first, second, third, and fourth signal components. These considerations are compatibility with existing receivers, and recoverability at the receiver.

Full compatibility implies receiver and transmitter compatibility such that existing standard receivers can receive widescreen EDTV signals and produce a standard display without special adaptors. Compatibility in this sense requires, for example, that the transmitter image scanning format is substantially the same as, or within the tolerance of, the receiver image scanning format. Compatibility also means that extra non-standard components must be physicially or perceptually hidden in the main signal when displayed on standard receivers. To achieve compatibility in the latter sense, the disclosed system uses the following techniques to hide the auxiliary components.

As discussed above, the side panel lows are physically hidden in the normal horizontal overscan region of a standard receiver. Component 2, which is a low-energy signal compared to the side panel lows component, and component 3, which is a normally low energy high frequency detail signal, are amplitude compressed and quadrature modulated onto an alternate subcarrier at 3.108 MHz, which is an interlaced frequency (an odd multiple of one-half the horizontal line rate). The frequency, phase, and amplitude of the alternate subcarrier are chosen so that the visibility of the modulated alternate subcarrier signal is reduced as much as possible, e.g., by controlling the phase of the alternate subcarrier from field to field so that it alternates from one field to the next. Although the modulated alternate subcarrier components reside entirely within the chrominance passband (2.0–4.2 MHz), the modulated alternate subcarrier components are perceptually hidden because they are displayed as field rate complementary color flicker, which is not perceived by the human eye at normal levels of chrominance saturation. Also, nonlinear amplitude compression of the modulation components prior to amplitude modulation advantageously reduces instantaneous amplitude overshoots to an acceptable lower level. Component 3 is hidden by time expanding the center panel information to match the standard 4:3 format, thereby spatially correlating (and temporally correlating) component 3 with component 1. This is accomplished by means of a format encoder as will be discussed. Such spatial correlation helps to prevent the component 3 information from interfering with the component 1 information after component 3 is quadrature modulated with component 2 on the alternate subcarrier and combined with component 1.

Component 4, the "helper" signal, also is hidden by time expanding the center panel information to match the standard 4:3 format, thereby spatially correlating component 4 with the main signal. Component 4 is removed at standard receivers with synchronous detectors, and is perceptually hidden at standard receivers with envelope detectors because it is spatially correlated with the main signal.

Recovery of components 1, 2, and 3 at a widescreen enhanced definition receiver is accomplished by utilizing a process of intraframe averaging at the transmitter and receiver. This process is associated with elements 38, 64, and 76 in the transmitter system of FIGS. 1 and 1a, and with associated elements at the receiver as will be discussed. Intraframe averaging is one type of signal conditioning technique which prepares two highly visually correlated signals for mutual combining so that they can be recovered efficiently and accurately afterwards, such as by means of a field storage device, free from V-T (vertical-temporal) crosstalk even in the presence of motion in the case of image representative signals. The type of signal conditioning employed for this purpose essentially involves making two signals identical on a field basis, i.e., by obtaining two samples with identical values a field apart. Intraframe averaging is a convenient technique for achieving this objective, but other techniques can also be used. Intraframe averaging is basically a linear, time varying digital pre-filtering and post-filtering process to ensure the accurate recovering of two highly visually correlated combined signals. Horizontal crosstalk is eliminated by guardbands between horizontal pre-filters at the transmitter encoder and post-filters at the receiver decoder.

The process of intraframe averaging in the time domain is illustrated generally by FIG. 1c, wherein pairs of fields are made identical by averaging pixels (A, B and C,D) that are 262H apart. The average value replaces the original values in each pair. FIG. 1d illustrates the process of intraframe averaging in the context of the system of FIG. 1. Starting with components 2 and 3, pairs of pixels (picture elements) 262H apart within a frame are averaged, and the average value (e.g., X1, X3 and Z1, Z3) replaces the original pixel values. This V-T averaging occurs within a frame and does not cross frame boundaries. In the case of component 1, intraframe averaging is performed only on information above approximately 1.5 MHz so as not to affect lower frequency vertical detail information. In the case of components 1 and 2, intraframe averaging is performed on a composite signal including luminance (y) and chrominance (c) components throughout the chrominance band. The chrominance component of the composite signal survives intraframe averaging because pixels 262H apart are "in-phase" with respect to the color subcarrier. The phase of the new alternate subcarrier is controlled so that it is exactly out of phase for pixels 262H apart. Thus when components 2 and 3 (after quadrature modulation) are added to component 1 in unit 40, pixels 262H apart have the form (M+A) and (M−A), where M is a sample of the main composite signal above 1.5 MHz, and A is a sample of the auxiliary modulated signal.

With intraframe averaging V-T crosstalk is virtually eliminated, even in the presence of motion. In this regard, the process of intraframe averaging produces identical samples 262H apart. At the receiver it is a simple matter to recover the information content of these samples exactly, i.e., free from crosstalk, by averaging and differencing pixel samples 262H apart within a frame as will be discussed, thereby recovering main and auxiliary signal information. At a decoder in the receiver, the intraframe averaged original information can be recovered substantially intact via an intraframe averaging and differencing process since the original highly visually correlated information has been made substantially identical field-to-field.

Also at the receiver, the RF channel is quadrature demodulated using a synchronous RF detector. Component 4 is thereby separated from the other three components. Intraframe averaging and differencing are used to separate component 1 from modulated components 2 and 3, and quadrature demodulation is used to separate components 2 and 3, as will be discussed with regard to FIG. 6.

After the four components have been recovered, the composite signals are NTSC decoded and separated into luminance and chrominance components. Inverse mapping is performed on all components to recover the widescreen aspect ratio, and the side panel highs are combined with the lows to recover full side panel resolution. The extended high frequency luminance detail information is shifted to its original frequency range and added to the luminance signal, which is converted to the progressive scan format using temporal interpolation and the helper signal. The chrominance signal is converted to progressive scan format using unassisted temporal interpolation. Finally, the luminance and chrominance progressive scan signals are converted to analog form and matrixed to produce RGB color image signals for display by a widescreen progressive scan display device.

Figure 2:
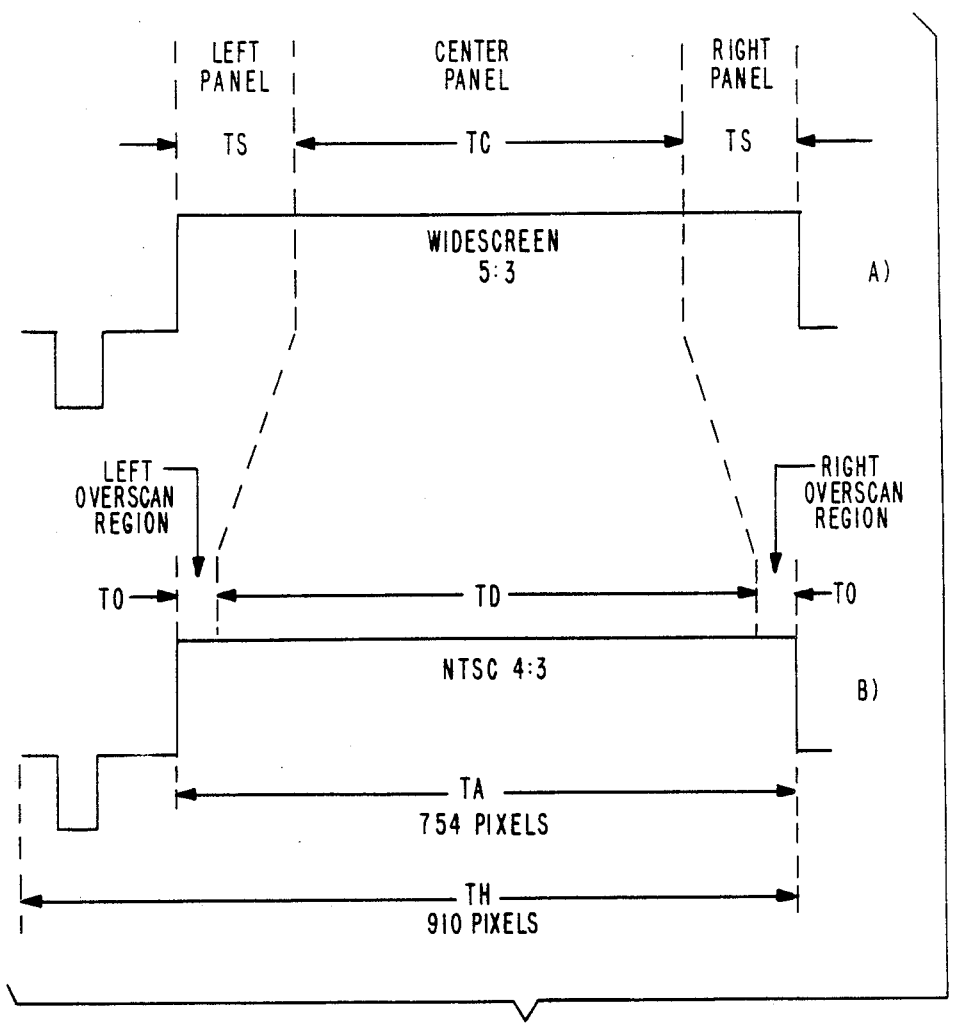

Before discussing the compatible widescreen encoding system of FIG. 1a, reference is made to signal waveforms A and B of FIG. 2. Signal A is a 5:3 aspect ratio widescreen signal that is to be converted to a standard NTSC compatible signal with a 4:3 aspect ratio as depicted by signal B. Widescreen signal A includes a center panel portion associated with primary image information occupying an interval TC, and left and right side panel portions associated with secondary image information and occupying intervals TS. In this example the left and right side panels exhibit substantially equal aspect ratios, less than that of the center panel which is centered therebetween.

Widescreen signal A is converted to NTSC signal B by compressing certain side panel information completely into the horizontal overscan regions associated with time intervals TO. The standard NTSC signal has an active line interval TA (approximately 52.5 microseconds duration) which encompasses overscan intervals TO, a display time interval TD which contains the video information to be displayed, and a total horizontal line time interval TH of approximately 63.556 microseconds duration. Intervals TA and TH are the same for both the widescreen and the standard NTSC signals. It has been found that almost all consumer television receivers have an overscan interval which occupies at least 4% of the total active line time TA, i.e., 2% overscan on the left and right sides. At an interlace sampling rate of 4 × fsc (where fsc is the frequency of the color subcarrier), each horizontal line interval contains 910 pixels (picture elements) of which 754 constitute the active horizontal line image information to be displayed.

The widescreen EDTV system is shown in greater detail in FIG. 1a. Referring to FIG. 1a, a widescreen high definition television camera generates a widescreen high definition television signal (in component form) corresponding to images having a greater aspect ratio (e.g., 5:3), a greater horizontal resolution (e.g., 600–800 lines) and a greater number of horizontal lines (e.g., 525 per field on 1050 per frame) compared with a conventional television signal produced by a conventional camera which typically corresponds images with a 4:3 aspect ratio, a horizontal resolution of about 400–600 lines and 262.5 horizontal lines per interlaced field. In the system shown in FIG. 1a, a 525 line per field, 60 field/second widescreen progressive scan camera 10 provides a widescreen color signal with R, G, B components and a wide aspect ratio of 5:3. An interlaced signal source providing 525 lines per interlaced field could also be used, but a progressive scan signal source produces superior results. A widescreen high definition camera generates a television signal having a greater video bandwidth compared to the television signal generated by a conventional camera, the video bandwidth of a widescreen camera being related to its aspect ratio, horizontal resolution and the total number of lines per frame, among other factors. The increased aspect ratio also corresponds to a horizontal compression of picture information when the signal is displayed by a standard television receiver with a 4:3 aspect ratio. For these reasons, it is necessary to modify the widescreen signal for full NTSC compatibility.

The color video signal processed by the encoder system of FIG. 1 contains both luminance and chrominance signal components. The luminance and chrominance signals contain both low and high frequency information, which in the following discussion will be referred to as "lows" and "highs", respectively.

The wide bandwidth widescreen progressive scan color video signal from camera 10 are matrixed in a unit 12 to derive luminance component Y and color difference signal components I and Q from the R, G, B color signals. Wideband progressive scan signals Y, I, Q are sampled at an eight-times chrominance subcarrier rate (8 × fsc), and are converted from analog to digital (binary) form individually by separate analog-to-digital converters (ADC) in an ADC unit 14 before being filtered individually by separate vertical-temporal (V-T) low pass filters in a filter unit 16 to produce filtered signals YF, IF and QF. These signals are each of the form indicated by waveform A in FIG. 2. The separate filters are 3X3 linear time invariant filters of the type shown in FIG. 10d as will be discussed. These filters reduce vertical-temporal resolution slightly, particularly diagonal V-T resolution, to prevent unwanted interlace artifacts (such as flicker, jagged edges, and other aliasing related effects) in the main signal (component 1 in FIG. 1) after progressive scan to interlace conversion. The filters maintain nearly full vertical resolution in stationary portions of the image.

The center panel expansion factor (CEF) is a function of the difference between the width of an image displayed by a widescreen receiver and the width of an image displayed by a standard receiver. The image width of a widescreen display with a 5:3 aspect ratio is 1.25 times greater than the image width of a standard display with a 4:3 aspect ratio. This factor of 1.25 is a preliminary center panel expansion factor which must be adjusted to account for the overscan region of a standard receiver, and to account for an intentional slight overlap of the boundary regions between the center and side panels as will be explained. These considerations dictate a CEF of 1.19.

The progressive scan signals from filter network 16 exhibit a bandwidth of 0–14.32 MHz and are respectively converted into 2:1 interlaced signals by means of progressive scan (P) to interlace (I) converters 17a, 17b and 17c. The bandwidth of output signals IF', QF' and YF' from converters 17a–17c exhibit a bandwidth of 0–7.16 MHz since the horizontal scanning rate for interlaced signals is half that of progressive scan signals. In the conversion process, the progressive scan signal is subsampled, taking half the available pixel samples to produce the 2:1 interlaced main signal. Specifically, each progressive scan signal is converted to 2:1 interlaced format by retaining either the odd or even lines in each field and reading out the retained pixels at a 4 × fsc rate (14.32 MHz). All subsequent digital processing of the interlaced signals occurs at the 4 × fsc rate.

Network 17c also includes an error prediction network. One output of network 17c, YF', is the interlaced subsampled luminance version of the prefiltered progressive scan component. Another output (luminance) signal of network 17c, YT, comprises vertical-temporal information derived from image frame difference information and represents a temporal prediction, or temporal interpolation, error between actual and predicted values of luminance samples "missing" at the receiver, as will be explained. The prediction is based on a temporal average of the amplitudes of "before" and "after"

pixels, which are available at the receiver. Signal YT, a luminance "helper" signal that assists to reconstruct the progressive scan signal at the receiver, essentially accounts for an error that the receiver is expected to make with respect to non-stationary image signals and facilitates cancellation of such error at the receiver. In stationary portions of an image the error is zero, and perfect reconstruction is performed at the receiver. It has been found that a chrominance helper signal is not needed as a practical matter, and that a luminance helper signal is sufficient to produce good results since the human eye is less sensitive to a lack of chrominance vertical or temporal detail. FIG. 2a illustrates the algorithm used to develop helper signal YT.

Referring to FIG. 2a, pixels A, X, and B in the progressive scan signal occupy the same spatial position in an image. Black pixels such as A and B are transmitted as the main signal and are available at the receiver. A white pixel, such as X, is not transmitted and is predicted by a temporal average $(A+B)/2$. That is, at the encoder a prediction is made for "missing" pixel X by averaging the amplitudes of "before" and "after" pixels A and B. The prediction value, $(A+B)/2$, is subtracted from the actual value, X, to produce a prediction error signal, corresponding to the helper signal, with an amplitude in accordance with the expression $X-(A+B)/2$. The helper signal is lowpass filtered horizontally by means of a 750 KHz low pass filter and conveyed as helper signal YT. Bandlimiting of the helper signal to 750 KHz is necessary to prevent this signal from interfering with the next lower RF channel after this signal is modulated onto the RF picture carrier. At the receiver, a similar prediction of missing pixel X is made by using an average of samples A and B, and the prediction error is added to the prediction. That is, X is recovered by adding the prediction error $X-(A+B)/2$ to the temporal average $(A+B)/2$. Thus the V-T helper signal facilitates the conversion from interlaced to progressive scan format.

The helper signal produced by the disclosed temporal prediction algorithm advantageously is a low energy signal compared to a prediction signal produced by some other algorithms, such as that used to produce a line differential signal as described by M. Tsinberg in an article "NTSC Two-Channel Compatible HDTV System", *IEEE Transactions on Consumer Electronics*, Vol. CE-33, No. 3, Aug. 1987, pp. 146-153. In still areas of an image, the error energy is zero because the prediction is perfect. A low energy condition is manifested by still and substantially still images (such as a news broadcast featuring a reporter against a still background). The disclosed algorithm has been found to produce the least objectionable artifacts after image reconstruction at the receiver, and the helper signal produced by the disclosed algorithm retains its usefulness after being band-limited filtered) to about 750 KHz. The helper signal produced by the disclosed algorithm advantageously exhibits zero energy in the presence of still image information, and consequently a helper signal associated with a still image is unaffected by filtering. A highly improved reconstructed widescreen image results even if the helper signal is not transmitted. In such case still portions of the image will be much sharper than a standard NTSC image, but moving portions will be somewhat "softer" and may exhibit a "beat" artifact. Thus a broadcaster need not transmit the helper signal initially, but can choose to upgrade the RF transmission at a later time.

The disclosed temporal prediction system is useful for both progressive scan and interlaced systems with higher than standard line rates, but works best with a progressive scan source having pixels A, X and B occupying the same spatial position in an image, which results in a perfect prediction for still images. The temporal prediction will be imperfect even in still portions of an image if the original widescreen image comes from an interlaced signal source. In such case the helper signal will have more energy and will introduce slight artifacts in still portions of a reconstructed image. Experiments have shown that the use of an interlaced signal source yields acceptable results with artifacts being noticeable only upon close inspection, but that a progressive scan signal source introduces fewer artifacts and produces preferred results.

Returning to FIG. 1a, interlaced widescreen signals IF', QF' and YF' from converters 17a-17c are respectively filtered by horizontal lowpass filters 19a, 19b and 19c to produce a signal IF" with a bandwidth of 0-600 KHz, a signal QF" with a bandwidth of 0-600 KHz, and a signal YF" with a bandwidth of 0-5 MHz. These signals are next subjected to a format encoding process which encodes each of these signals into a 4:3 format by means of format encoding apparatus associated with a side-center signal separator and processor unit 18. Briefly, the center portion of each widescreen line is time-expanded and mapped into the displayed portion of the active line time with a 4:3 aspect ratio. Time expansion causes a decrease in bandwidth so that the original widescreen interlaced frequencies are made compatible with the standard NTSC bandwidth. The side panels are split into horizontal frequency bands so that the I and Q color highs component exhibit a bandwidth of 83KHz-600KHz (as shown for signal IH in FIG. 7) and the Y luminance highs component exhibits a bandwidth of 700KHz-5.0MHz (as shown for signal YH in FIG. 6). The side panel lows, i.e., signals YO, IO and QO, include a DC component and are time-compressed and mapped into the left and right horizontal image overscan regions on each line. The side panel highs are processed separately. Details of this format encoding process follow immediately below.

In the course of considering the following encoding details, it will be helpful to also consider FIG. 1e, which depicts the process of encoding components 1, 2, 3 and 4 in the context of displayed center and side panel information. Filtered interlaced signals IF", QF" and YF" are processed by side-center panel signal separator and processor 18 to produce three groups of output signals YE, IE and QE; YO, IO and QO; and YH, IH and QH. The first two groups of signals (YE, IE, QE and YO, IO, QO) are processed to develop a signal containing a full bandwidth center panel component, and side panel luminance lows compressed into horizontal overscan regions. The third group of signals (YH, IH, QH) is processed to develop a signal containing side panel highs. When these signals are combined, an NTSC compatible widescreen signal with a 4:3 display aspect ratio is produced.

Figure 3:
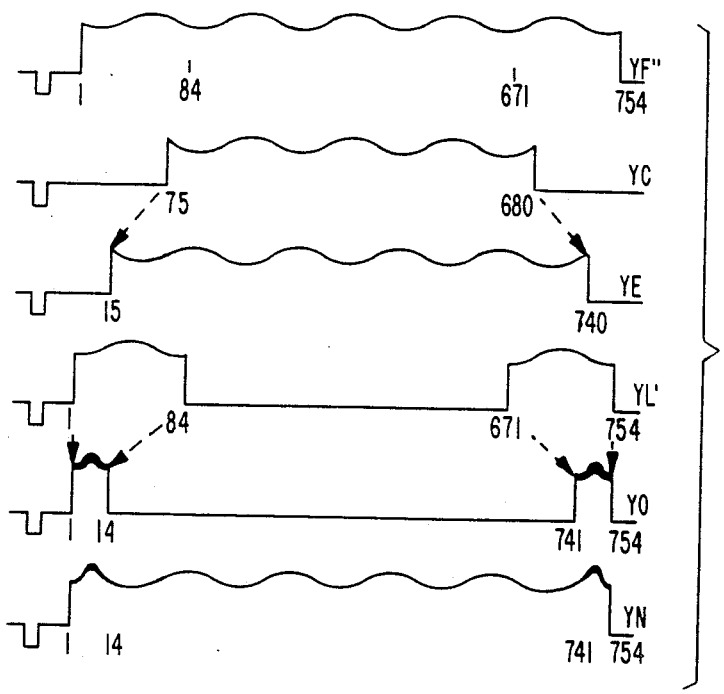

Signals YE, IE and QE contain complete center panel information and exhibit the same format, as indicated by signal YE in FIG. 3. Briefly, signal YE is derived from signal YF" as follows. Widescreen signal YF" contains pixels 1–754 occuring during the active line interval of the widescreen signal, containing side and center panel information. The wideband center panel information (pixels 75–680) is extracted as a center panel luminance signal YC via a time de-multiplexing process. Signal YC is time expanded by the center panel expansion factor of 1.19 (i.e., 5.0 MHz ÷4.2 MHz) to produce NTSC compatible center panel signal YE. Signal YE exhibits an NTSC compatible bandwidth (0–4.2 MHz) due to the time expansion by factor 1.19. Signal YE occupies picture display interval TD (FIG. 2) between overscan regions TO. Signals IE and QE are developed from signals IF″ and QF″, respectively, and are similarly processed in the manner of signal YE.

Signals YO, IO and QO provide the low frequency side panel information ("lows") which is inserted into the left and right horizontal overscan regions. Signals YO, IO and QO exhibit the same format, as indicated by signal YO in FIG. 3. Briefly, signal YO is derived from signal YF″ as follows. Widescreen signal YF contains left panel information associated with pixels 1–84 and right panel information associated with pixels 671–754. As will be discussed, signal YF″ is low pass filtered to produce a luminance lows signal with a 0–700 KHz bandwidth, from which signal a left and right side panel lows signal is extracted (signal YL′ in FIG. 3) via a time de-multiplexing process. Luminance lows signal YL′ is time compressed to produce side panel lows signal YO with compressed low frequency information in the side overscan regions associated with pixels 1–14 and 741–754. The compressed side lows signal exhibits an increased BW proportional to the amount of time compression. Signals IO and QO are developed from signals IF″ and QF″ respectively, and are similarly processed in the manner of signal YO.

Signals YE, IE, QE and YO, IO, QO are combined by a side-center signal combiner 28, e.g. a time multiplexer, to produce signals YN, IN and QN with an NTSC compatible bandwidth and a 4:3 aspect ratio. These signals are of the form of signal YN shown in FIG. 3. Combiner 28 also includes appropriate signal delays for equalizing the transit times of the signals being combined. Such equalizing signal delays are also included elsewhere in the system as required to equalize signal transit times.

A modulator 30, bandpass filter 32, H-V-T bandstop filter 34 and combiner 36 constitute an improved NTSC signal encoder 31. Chrominance signals IN and QN are quadrature modulated on a subcarrier SC at the NTSC chrominance subcarrier frequency, nominally 3.58 MHz, by modulator 30 to produce a modulated signal CN. filtered in the vertical (V) and temporal (T) dimensions by means of two-dimensional (V-T) filter 32, which removes crosstalk artifacts in the interlaced chrominance signal before it is applied to a chrominance signal input of combiner 36 as a signal CP. Luminance signal YN is bandstop filtered in the horizontal (H), vertical (V) and temporal (T) dimensions by means of three-dimensional H-V-T bandstop filter 34 before being applied, as a signal YP, to a luminance input of combiner 36. Filtering luminance signal YN and chrominance color difference signals IN and QN serves to assure that luminance-chrominance crosstalk will be significantly reduced after subsequent NTSC encoding.

H-V-T bandstop filter 34 in FIG. 1a and removes upwardly moving diagonal frequency components from luminance signal YN. These frequency components are similar in appearance to chrominance subcarrier components and are removed to make a hole in the frequency spectrum into which modulated chrominance will be inserted. The removal of the upwardly moving diagonal frequency components from luminance signal YN does not visibly degrade a displayed picture because it has been determined that the human eye is substantially insensitive to these frequency components. Filter 34 exhibits a cut-off frequency of approximately 1.5 MHZ so as not to impair luminance vertical detail information.

V-T bandpass filter 32 reduces the chrominance bandwidth so that modulated chrominance side panel information can be inserted into the hole created in the luminance spectrum by filter 34. Filter 32 reduces the vertical and temporal resolution of chrominance information such that static and moving edges are slightly blurred, but this effect is of little or no consequence due to the insensitivity of the human eye to such effect.

Figure 4:
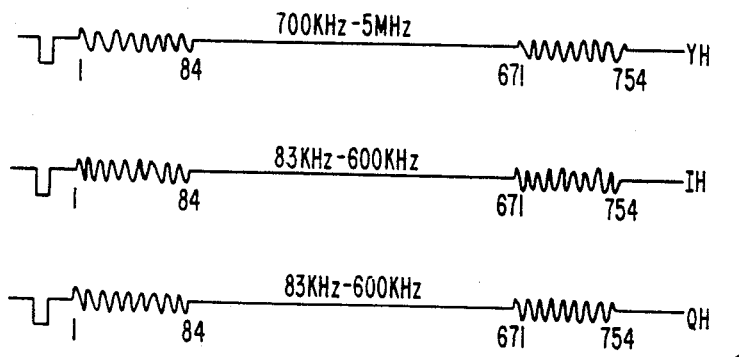

An output center/side lows signal C/SL from combiner 36 contains NTSC compatible information to be displayed, as derived from the center panel of the widescreen signal, as well as compressed side panel lows (both luminance and chrominance) derived from the side panels of the widescreen signal and situated in the left and right horizontal overscan regions not seen by a viewer of an NTSC receiver display. The compressed side panel lows in the overscan region represent one constituent part of the side panel information for a widescreen display. The other constituent part, the side panel highs, is developed by processor 18 as will be discussed below. Side panel high signals YH (luminance highs), IH (I highs) and QH (Q highs) are illustrated by FIG. 4. contain left panel high frequency information associated with left panel pixels 1–84, and right panel high frequency information associated with right panel pixels 671–754.

Signal C/SL is processed by an intraframe averager 38 to produce a signal N, which is applied to an input of an adder 40. Intraframe averaged signal N is essentially identical to signal C/SL because of the high visual correlation of intraframe image information of signal C/SL. Averager 38 averages signal C/SL above approximately 1.5 MHz and assists to reduce or eliminate vertical-temporal crosstalk between the main and auxiliary signals. The highpass frequency range of 1.5 MHz and above over which intraframe averager 38 operates was chosen to assure that full intraframe averaging is accomplished for information at 2 MHz and above, to prevent luminance vertical detail information from being degraded by the process of intraframe averaging. Horizontal crosstalk is eliminated by means of a 200 KHz guardband between a filter associated with intraframe averager 38 in encoder 31 and a filter associated with an intraframe averager-differencer unit in the decoder of FIG. 6.

Figure 5:
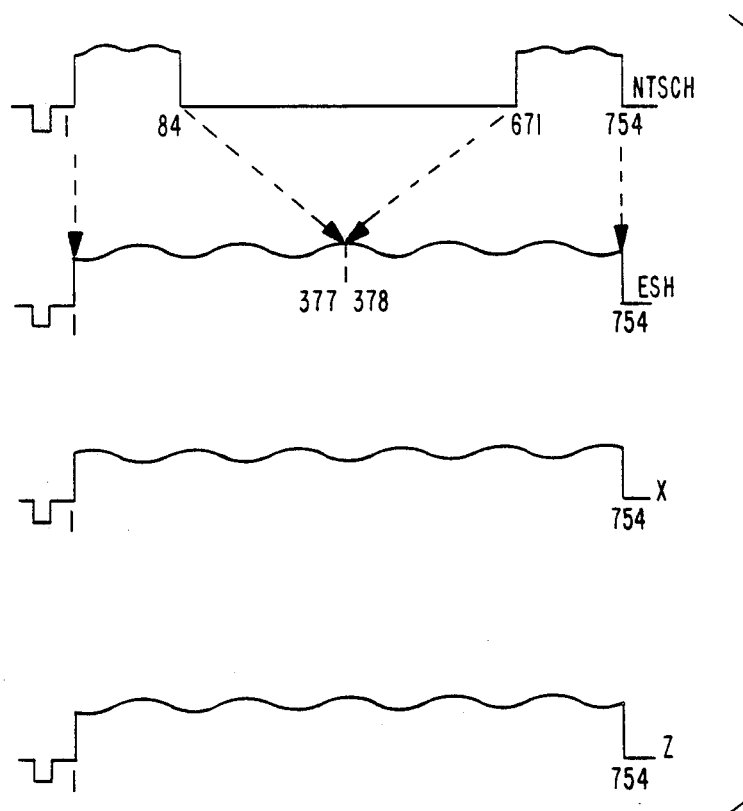

Signals IH, QH, and YH are placed in NTSC format by means of an NTSC encoder 60 which is similar to encoder 31. Specifically, encoder 60 includes apparatus for quadrature modulating side panel chrominance highs information onto the side panel luminance highs information at 3.58 MHz, to produce signal NTSCH, the side panel highs information in NTSC format. This signal is illustrated by FIG. 5.

The use of multi-dimensional bandpass filtering in NTSC encoders 31 and 60 advantageously permits the luminance and chrominance components to be separated virtually free of crosstalk at the receiver when the receiver includes complementary multi-dimensional filtering for separating the luminance and chrominance information. The use of complementary filters for luminance/chrominance encoding and decoding is called cooperative processing and is discussed in detail in an article by C. H. Strolle titled "Cooperative Processing for Improved Chrominance/Luminance Separation", published in the *SMPTE Journal*, Vol. 95, No. 8, Aug. 1986, pp. 782-789. Even standard receivers using conventional notch and line-comb filters will benefit from the use of such multi-dimensional pre-filtering at the encoder by exhibiting reduced chrominance/luminance crosstalk.

Signal NTSCH is time expanded by a unit 62 to produce an expanded side highs signal ESH. Specifically, as shown in FIG. 5, the expansion is accomplished by a "mapping" process which maps left side panel pixels 1-84 of signal NTSCH into pixel positions 1-377 of signal ESH, i.e., the left side highs of signal NTSCH are expanded to occupy one half the line time of signal ESH. The right side panel portion (pixels 671-754) of signal NTSCH is similarly processed. The time expansion process reduces the horizontal bandwidth of the information comprising signal ESH (compared to that of signal NTSCH) by a factor of 377/84. Signal ESH is intra-frame averaged by a network 64, to produce a signal X as illustrated in FIG. 5. Intraframe averaged signal X is essentially identical to signal ESH because of the high visual correlation of intraframe image information of signal ESH. Signal X is applied to a signal input of a quadrature modulator 80.

Signal YF' is also filtered by a horizontal bandpass filter 70 with a passband of 5 MHz-6.2 MHz. The output signal from filter 70, horizontal luminance highs, is applied to an amplitude modulator 72 where it amplitude modulates a 5 MHz carrier signal $f_c$. Modulator 72 includes an output low pass filter with a cut-off frequency of approximately 1.2 MHz to obtain a signal with a 0-1.2 MHz passband at the output of modulator 72. The upper (aliased) sideband (5.0-6.2 MHz) produced by the modulation process is removed by the 1.2 MHz lowpass filter. Effectively, horizontal luminance highs frequencies in the range 5.0 MHz-6.2 MHz have been shifted to the range 0-1.2 MHz as a result of the amplitude modulation process and subsequent low pass filtering. The carrier amplitude should be large enough so that the original signal amplitudes are retained after filtering by the 1.2 MHz low pass filter. That is, a frequency shift without affecting amplitude is produced.

The frequency-shifted horizontal luminance highs signal from unit 72 is encoded by means of a format encoder 74 to spatially correlate this signal with the main signal, C/SL. Encoder 74 is similar to format encoding networks associated with units 18 and 28 for the purpose of expanding the center panel information and compressing the side panel lows information into the horizontal overscan region. That is, encoder 74 encodes the frequency shifted horizontal luminance highs into a standard 4:3 format. When the center portion of the input signal to encoder 74 is time expanded, its bandwidth drops to approximately 1.0 MHz from 1.2 MHz, and the output signal from encoder 74 becomes spatially correlated with the main signal. The side panel information is lowpass filtered within unit 72 to 170 KHz before being time-compressed by encoder 74. The signal from encoder 74 is intraframe averaged by means of apparatus 76, before being applied to unit 80 as signal Z. Intraframe averaged signal Z is essentially identical to the signal from encoder 74 because of the high visual correlation of intraframe image information of the signal from encoder 74. Modulating signal X, a composite signal containing luminance and chrominance information, and modulating signal Z exhibit substantially the same bandwidth, approximately 0-1.1 MHz.

Unit 80 performs nonlinear gamma function amplitude compression on large amplitude excursions of the two auxiliary signals, X and Z, before these signals quadrature modulate an alternate subcarrier signal ASC. A gamma of 0.7 is used, whereby the absolute value of each sample is raised to the 0.7 power and multiplied by the sign of the original sample value. Gamma compression reduces the visibility of potentially interfering large amplitude excursions of the modulated signals on exisiting receivers, and allows predictable recovery at the widescreen receiver since the inverse of the gamma function employed at the encoder is predictable and can be readily implemented at the receiver decoder.

The amplitude compressed signals are then quadrature modulated on a 3.1075 MHz phase-controlled alternate subcarrier ASC, which is an odd multiple of one half the horizontal line frequency (395 × H/2). The phase of the alternate subcarrier is caused to alternate 180° from one field to the next. The field alternating phase of the alternate subcarrier permits the auxiliary modulating information of signals X and Z to overlap chrominance information and facilitates the separation of the auxiliary information using a relatively uncomplicated field storage device at the receiver. The quadrature modulated signal, M, is added to signal N in adder 40. The resulting signal, NTSCF, is a 4.2 MHz NTSC compatible signal.

The described non-linear gamma function employed in the encoder for the purpose of large amplitude compression is a constituent part of a non-linear companding (compression-expansion) system which also includes a complementary gamma function in the decoder of a widescreen receiver for the purpose of amplitude expansion, as will be discussed subsequently. The disclosed non-linear companding system has been found to significantly reduce the impact of auxiliary non-standard information upon the standard information, without causing visible degradation of an image due to noise effects. The companding system uses a non-linear gamma function to instantaneously compress large amplitude excursions of auxiliary, non-standard widescreen high frequency information at the encoder, with a complementary non-linear gamma function being used to correspondingly expand such high frequency information at the decoder. The result is a reduction in the amount of interference with existing standard video information caused by large amplitude auxiliary high frequency information, in the disclosed compatible widescreen system wherein non-standard auxiliary widescreen information is split into low and high frequency portions subjected to companding. At the decoder, non-linear amplitude expansion of the compressed high frequency information does not result in excessive perceived noise since large amplitude high frequency information is typically associated with high contrast image edges, and the human eye is insensitive to noise at such edges. The described companding process also advantageously reduces cross-modulation products between the alternate and chrominance subcarriers, with associated reduction in visible beat products.

Luminance detail signal YT exhibits a bandwidth of 7.16 MHz and is encoded into the 4:3 format (in the same manner as accomplished by encoder 74, by means of a format encoder 78, and is horizontally lowpass filtered to 750 KHz by a filter 79 to produce a signal YTN. The side portions are lowpass filtered to 125 KHz before time compression by means of an input lowpass filter of format encoder 78, corresponding to input filter 610 of the apparatus shown in FIG. 6 but with a cut-off frequency of 125 KHz. The side portion highs are discarded. Thus signal YTN is spatially correlated with main signal C/SL.

Signals YTN and NTSCF are converted from digital (binary) to analog form by means of DAC units 53 and 54 respectively, before these signals are applied to an RF quadrature modulator 57 for modulating a TV RF carrier signal. The RF modulated signal is afterwards applied to a transmitter 55 for broadcast via an antenna 56.

Alternate subcarrier ASC associated with modulator 80 is horizontally synchronized and has a frequency chosen to insure adequate separation (e.g., 20–30 db.) of side and center information, and to have insignificant impact upon an image displayed by a standard NTSC receiver. The ASC frequency preferably should be an interlace frequency at an odd multiple of one half the horizontal line rate so as not to produce interference which would compromise the quality of a displayed picture.

Quadrature modulation such as provided by unit 80 advantageously permits two narrowband signals to be transmitted simultaneously. Time expanding the modulating highs signals results in a bandwidth reduction, consistent with the narrowband requirements of quadrature modulation. The more the bandwidth is reduced, the less likely it is that interference between the carrier and modulating signals will result. Furthermore, the typically high energy DC component of the side panel information is compressed into the overscan region rather than being used as a modulating signal. Thus the energy of the modulating signal, and therefore the potential interference of the modulating signal, are greatly reduced.

Figure 6:
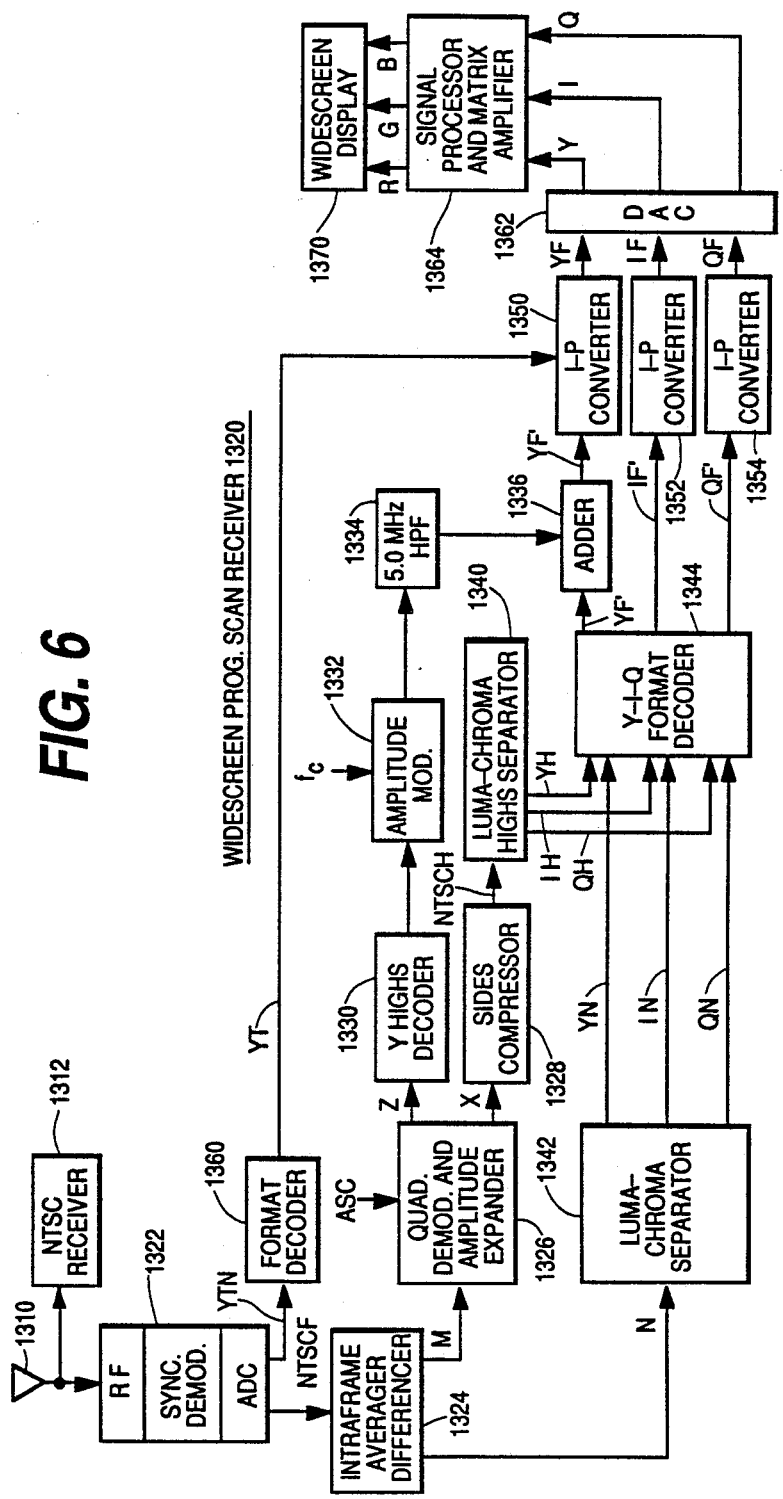
FIG. 6 shows a block diagram of a portion of a widescreen EDTV receiver including a decoder system.

The encoded NTSC compatible widescreen signal broadcast by antenna 56 is intended to be received by both NTSC receivers and widescreen receivers, as illustrated by FIG. 6.

In FIG. 6, a broadcast compatible widescreen EDTV interlaced television signal is received by an antenna 1310 and applied to an antenna input of an NTSC receiver 1312. Receiver 1312 processes the compatible widescreen signal in normal fashion to produce an image display with a 4:3 aspect ratio, with the widescreen side panel information being in part compressed (i.e., "lows") into the horizontal overscan regions out of sight of the viewer, and being in part (i.e., "highs") contained in the modulated alternate subcarrier signal which does not disrupt the standard receiver operation.

The compatible widescreen EDTV signal received by antenna 1310 is also applied to a widescreen progressive scan receiver 1320 capable of displaying a video image with a wide aspect ratio of, e.g., 5:3. The received widescreen signal is processed by an input unit 1322 including radio frequency (RF) tuner and amplifier circuits, a synchronous video demodulator (a quadrature demodulator) which produces a baseband video signal, and analog-to-digital (ADC) converter circuits for producing a baseband video signal (NTSCF) in binary form. The ADC circuits operate at a sampling rate of four times the chrominance subcarrier frequency (4 × fsc).

Signal NTSCF is applied to an intraframe averager-differencer unit 1324 which averages (additively combines) and differences (subtractively combines) image lines 262H apart within frames, above 1.7 MHz, to recover main signal N and quadrature modulated signal M substantially free from V-T crosstalk. A 200 KHz horizontal crosstalk guardband is provided between the 1.7 MHz lower limit operating frequency of unit 1324 and the 1.5 MHz lower limit operating frequency of unit 38 in the encoder of FIG. 1a. Recovered signal N contains information which is essentially visually identical to image information of main signal C/SL, due to the high visual intraframe image correlation of original main signal C/SL as intraframe averaged in the encoder of FIG. 1a.

Signal M is coupled to a quadrature demodulator and amplitude expander unit 1326 for demodulating auxiliary signals X and Z in response to an alternate subcarrier ASC with a field alternating phase, similar to signal ASC discussed in connection with FIG. 1a. Demodulated signals X and Z contain information which is essentially visually identical to image information of signal ESH and of the output signal from unit 74 in FIG. 1a, due to the high visual intraframe image correlation of these signals as intraframe averaged by the encoder of FIG. 1a. Unit 1326 also includes a 1.5 MHz lowpass filter to remove unwanted high frequency demodulation products at twice the alternate subcarrier frequency, and an amplitude expander for expanding the (previously compressed) demodulated signals using an inverse-gamma function (gamma $=1/0.7 = 1.429$), i.e., the inverse of the non-linear compression function performed by unit 80 in FIG. 1a.

A unit 1328 time compresses the color encoded side panel highs so that they occupy their original time slots, thereby recovering signal NTSCH. Unit 1328 time compresses signal NTSCH by the same amount that unit 62 of FIG. 1a time expanded signal NTSCH.

A luminance (Y) highs decoder 1330 decodes luminance horizontal highs signal Z into widescreen format. The sides are time expanded (by the same amount as sides time compression in the encoder of FIG. 1a), and the center is time compressed (by the same amount as sides time expansion in the encoder of FIG. 1a). The panels are spliced together in the 10-pixel overlap region.

Modulator 1332 amplitude modulates the signal from decoder 1330 bn a 5.0 MHz carrier $f_c$. The amplitude modulated signal is afterwards high pass filtered by a filter 1334 with a 5.0 Mhz cut-off frequency to remove the lower sideband. In the output signal from filter 1334, center panel frequencies of 5.0 to 6.2 MHz are recovered, and side panel frequencies of 5.0 to 5.2 MHz are recovered. The signal from filter 1334 is applied to an adder 1336.

Signal NTSCH from compressor 1328 is applied to a unit 1340 for separating the luminance highs from the chrominance highs to produce signals YH, IH and QH.

Signal N from unit 1324 is separated into its constituent luminance and chrominance components YN, IN and QN by means of a luminance-chrominance separator 1342 which can be similar to separator 1340 and which can employ apparatus of the type shown in FIG. 18.

Signals YH, IH, QH and YN, IN, QN are provided as inputs to a Y-I-Q format decoder 1344, which decodes the luminance and chrominance components into widescreen format. The side panel lows are time expanded, the center panel is time compressed, the side panel highs are added to the side panel lows, and the side panels are spliced to the center panel in the 10-pixel overlap region.

Signal YF' is coupled to adder 1336 where it is summed with the signal from filter 1334. By this process recovered extended high frequency horizontal luminance detail information is added to decoded luminance signal YF'.

Signals YF', IF' and QF' are converted from interlaced to progressive scan format by means of converters 1350, 1352 and 1354, respectively. Luminance progressive scan converter 1350 also responds to "helper" luminance signal YT from a format decoder 1360, which decodes encoded "helper" signal YTN. Decoder 1360 decodes signal YTN into widescreen format, I and Q converters 1352 and 1354 convert interlace to progressive scan signals by temporally averaging lines one frame apart to produce the missing progressive scan line information.

Luminance progressive scan converter unit 1350 is similar to that shown in FIG. 20, except that signal YT is added as shown by the arrangement of FIG. 21. In this unit a "helper" signal sample, YT, is added to a temporal average to assist reconstructing a missing progressive scan pixel sample. Full temporal detail is recovered within the band of horizontal frequencies contained in the encoded line difference signal (750 KHz, after encoding). Above this band of horizontal frequencies signal YT is zero, so the missing sample is reconstructed by temporal averaging.

Widescreen progressive scan signals YF, IF and QF are converted to analog form by means of a digital-to-analog converter 1362 before being applied to a video signal processor and matrix amplifier unit 1364. The video signal processor component of unit 1364 includes signal amplifying, DC level shifting, peaking, brightness control, contrast control and other conventional video signal processing circuits. Matrix amplifier 1364 combines luminance signal YF with color difference signals IF and QF to produce color image representative video signals R, G and B. These color signals are amplified by display driver amplifiers in unit 1364 to a level suitable for directly driving a widescreen color image display device 1370, e.g. a widescreen kinescope.

As was earlier noted a widescreen high definition television camera is, very expensive compared to a conventional television camera intended for use in a transmission system conforming to an existing television standard (e.g., NTSC). In addition, as also noted earlier, the greater aspect ratio, greater horizontal resolution and greater vertical resolution combine to produce an overall bandwidth for the widescreen high definition television signal which is the order of 20 MHz for a 1050 line per frame, 5:3 aspect ratio image, whether in progressive scan or in interlace form. Television signals with this bandwidth cannot be recorded by conventional video tape systems.

FIGS. 1a–1 and 1a–2 show modifications to the widescreen EDTV system shown in FIG. 1a which utilize a relatively low cost conventional television camera and allow recording by a conventional video tape system. The modified systems permit local broadcasters to offer widescreen transmission immediately at a reasonable initial cost, with the option of updating the system later. While the modified systems, employing a conventional television camera, will not produce images with the vertical resolution of the EDTV system shown in FIG. 1a, they do provide for an increase in horizontal resolution compared with the existing conventional television system, for the reasons to be explained below. By way of example, RCA TK-47, TK-76 or TK-86 now in use may be employed in the modified systems.

In FIGS. 1a–1 and 1a–2, the widescreen EDTV transmission system shown in FIG. 1a, utilizing widescreen high definition camera 10 as a television signal source, is reproduced with the same reference designations to facilitate an understanding of the modifications. However, it will be understood that high definition camera 10 is not employed and is replaced by a conventional camera 82.

Basically, the modifications comprise: utilizing conventional television camera 82 normally intended to be used in a conventional television transmission system conforming to a conventional television transmission standard (e.g., NTSC); modifying the conventional camera, e.g., by replacing the conventional lens normally employed with an anamorphic lens 84 so as to produce a widescreen television signal corresponding to the increased aspect ratio (e.g., 5:3) of widescreen high definition camera 10; and coupling the widescreen television signal produced by conventional camera 82 in conjunction with anamorphic lens 84 without restriction of the horizontal bandwidth normally required to conform the television signal generated by conventional camera 82 to the NTSC transmission standard to the input (the inputs of low pass filters 19a, 19b and 19c) of the section of the encoder which produces the first, second and third components of the transmitted television signal as described above with reference to FIGS. 1 and 1a. In the system shown in FIGS. 1a–1 and 1a–2, a matrix 86 and ADC networks 88 are provided for processing the widescreen television signal produced by camera 82 to produce Y, I and Q component signals in digital form, corresponding to IF', QF' and YF', which are coupled to the inputs of low pass filters 19a, 19b and 19c, respectively.

The widescreen television signal (in component form) produced by the combination of camera 82 and anamorphic lens 84 corresponds to the same aspect ratio and has the same waveform (see FIG. 2) as the high definition television signal produced by widescreen high definition camera 10 and is encoded in the same way by the encoder except as follows.

The widescreen television signal produced by the combination of conventional camera 82 and anamorphic lens 84 is in 2:1 interlace rather than progressive scan form and has 262.5 horizontal lines per field (i.e., 525 horizontal lines per frame) rather than 525 horizontal lines per field (i.e., 1050 horizonal lines per frame). Therefore, progressive scan to interlace converters 17a, 17b and 17c is not necessary and are by-passed. In addition the fourth or "helper" component may be omitted. The difference between the number of horizontal lines of the widescreen television signal generated by camera 82 and the widescreen high definition television signal generated by camera 10 is reflected in a widescreen EDTV receiver by a corresponding reduction in vertical resolution. However, since the widescreen EDTV receiver (see FIG. 6) includes an interlace to progressive scan converter arrangement, inter-line flicker in the images reproduced by the television signal generated by the modified systems is reduced.

Although the horizontal resolution (e.g., 400–600 lines) associated with the widescreen television signal produced by the combination of conventional camera 82 and anamorphic lens 84 is lower than the horizontal resolution (e.g., 600-800 lines) associated with the widescreen high definition television signal produced by widescreen high definition camera 10, an enhanced horizontal resolution compared with the NTSC transmission standard is still made possible in a widescreen EDTV receiver. This is due to the third component which corresponds to high frequency horizontal detail, as follows. The horizontal bandwidth of the television signal produced by a conventional camera itself may extend well beyond 4.2 MHz, typically corresponding to a horizontal resolution of between 400 and 600 lines. However, in a conventional NTSC transmission system, the television signal generated by the camera is restricted by a low pass filter to a bandwidth of 4.2 MHz prior to transmission to prevent interference between picture and sound components. This is not necessary in the EDTV system shown in FIGS. 1a, 1a-1 and 1a-2 because the third or high frequency horizontal detail component is modulated on the alternate subcarrier.

While the increase in horizontal resolution produced by the modified widescreen EDTV system is not as great as that produced by the widescreen EDTV system shown in FIG. 1a, the difference is not as significant as might be expected because use of the full horizontal bandwidth of a widescreen high definition television signal is not possible anyway due to the 6.2 MHz upper frequency limit of bandpass filter 70.

A widescreen image will be reproduced in a widescreen receiver as described above with reference to FIG. 6.

It is of course known to use an anamorphic lens with film cameras to film widescreen motion pictures. However, when the image is projected without another compensating an anamorphic lens, objects in the reproduced image will appear thinner than normal. This is due to the geometric distortion resulting from the use of the anamorphic lens with the film camera.

In the present television system, the time-compression resulting from the use of the anamorphic lens is compensated for by the time-expansion of the portion of the widescreen television signal corresponding to the center portion of the widescreen image. As a result, the image reproduced in a conventional television receiver will appear normal (i.e., objects will not appear too thin).

While, as noted above, widescreen high definition camera 10 is not employed in the modified systems at the same time conventional camera 82 is employed, it is desirable to provide input structure for future use of widescreen high definition camera 10 to provide for upgraded widescreen EDTV transmissions. Thus, the system shown in FIG. 1a-1 has an input 85 for receiving a widescreen television signal (in component form) from conventional camera 82 as modified by anamorphic lens 84 and an input 11 for alternatively receiving a widescreen high definition television signal (in component form) from widescreen high definition camera 10. Matrix 12, ADC networks 14, V-T LPT networks 16 and P-I converters 17a, 17b and 17c are retained for processing the widescreen high definition television signal produced by camera 10 to produce the IF', QF' and YF' component signals coupled to the inputs of low pass filters 19a, 19b and 19c.

While camera 82 will produce a television signal with high frequency components corresponding to increased horizontal resolution (absent the low pass filter used in the NTSC transmission system to restrict the horizontal bandwidth to 4.2 MHz as explained above), a peaking adjustment 83, normally a part of a conventional camera, can be adjusted to provide increased high frequency content and horizontal bandwidth. This may be required because of a slight reduction in horizontal resolution due to anamorphic lens 84. The high frequency components will be encoded in the transmitted signal in the form of the third component.

FIG. 1a-2 indicates a modification to the arrangement shown in FIG. 1a-1 utilizing a switch 90 so that matrix 12 and ADC networks 14 can be used for both conventional camera 82 and widescreen high definition camera 10. However, it requires the same components (e.g., R, G and B) to be produced by the two cameras. The selected camera is connected to input 11. When conventional camera 82 is connected to input 11, switch 90 is controlled so that the widescreen television signal (in component form) produced by ADC network 14 is coupled directly to low pass filters 19a, 19b and 19c through switch output 92 (which also comprises a first encoder input). When widescreen high definition camera 10 is connected to input 11, switch 90 is controlled so that the widescreen high definition television signal (in component form) produced by ADC network 14 is coupled to V-T LPT networks 16 through switch output 94 (which also comprises a second encoder input).

FIG. 1a-2 also shows that a conventional tape recorder (VTR) 96 can be coupled between conventional camera 82 and input 11 for recording the widescreen television signal produced by the combination of conventional camera 82 and anamorphic lens 84 and playing the recorded widescreen television signal back for encoding and transmission by the widescreen EDTV encoder. A conventional VTR has sufficient bandwidth to record the television signal generated by conventional camera 82 without requiring restriction of the horizontal bandwidth, as is the case for transmission. In the system shown in FIG. 1a-1, VTR 96 would be coupled between camera 82 and input 85. It will be understood, of course, that VTR 96 is used to record at one time and play back at another and is not intended to be continuously connected to the encoder input. For example, Matshushita M-II format, Sony BETA SP format and Ampex, Sony, or Hitachi C format VTRs are all suitable for use. Digital VTRs, such as the Ampex D-2 format VTR, are also suitable.

Finally, FIG. 1a-2 indicates that instead of the combination of conventional camera 82 and anamorphic lens 84, a conventional camera 98 with a conventional lens 100, but electrically modified by changing either or both the horizontal and vertical scanning control signals to produce a widescreen television signal may be employed. This is only practical in cameras utilizing an image pickup tube because in a charge coupled delay (CCD) device camera, additional cells are required for a widescreen television signal. In a tube camera, the aspect ratio can readily be changed by adjustment of the amplitude of one or both of the horizontal or vertical deflection signals.

The use of an anamorphic lens is desirable with a CCD camera for the reasons stated above. The use of an anamorphic lens is also desirable with a tube camera because changing the deflection waveforms causes the tube to be scanned in regions in which optimal performance is not intended. In addition, the "burned-in" condition of the previously used 4:3 scanning area compared to the newly used portions of the 5:3 scanning area may cause disturbing partitions in the displayed image.

While camera 82 and VTR 96 have been indicated as generating R, G and B component signals consistent with the components produced by camera 10, other components such as Y, R-Y, and B-Y may alternatively be used. Conventional camera 82 and conventional VTR 96 may also produce a composite signal. In that case a demodulator for producing the components (e.g., I, Q and Y) processed by the encoder will be needed.

While the modifications shown in FIGS. 1a-1 and 1a-2 have been described with respect to a studio transmission environment, they may as well be employed in a consumer cam-corder (i.e., a combination of a camera and a VTR).

What is claimed is:

1. In a widescreen enhanced definition television system intended for reproducing images having a greater aspect ratio and a greater horizontal resolution compared with images having a conventional aspect ratio and a conventional horizontal resolution and a conventional number of lines per field reproduced in a conventional television system operating in conformance to a conventional television transmission standard with conventional transmission channels of a conventional transmission bandwidth, apparatus comprising:

a conventional television camera for generating a television signal having said conventional number of horizontal lines per field, each horizontal line having a given active line interval normally corresponding to an image with said conventional aspect ratio, and a horizontal bandwidth corresponding to a horizontal resolution greater than said conventional horizontal resolution; said camera being normally intended to be used in said conventional television system in conjunction with low pass filter means for filtering said television signal generated by said camera to limit its horizontal bandwidth to said conventional horizontal bandwidth corresponding to said conventional horizontal resolution to produce a conventional television signal conforming to said conventional television transmission standard and suitable for transmission through one of said conventional transmission channels;

aspect ratio modification means for modifying said conventional camera so that said television signal generated by said camera is modified to be a widescreen television signal having said conventional number of horizontal lines per field, each horizontal line having said given active line interval but now corresponding to a widescreen image with an aspect ratio greater than said conventional aspect ratio, and a horizontal bandwidth greater than said conventional horizontal bandwidth of said conventional television system; said widescreen television signal having within said given active image interval left side, center and right side signal portions corresponding to left side, center and right side image portions of said widescreen image;

encoder means having an input at which said widescreen television signal produced by said camera as modified is received and an output at which a compatible widescreen television signal suitable for transmission through one of said conventional transmission channels is produced; said compatible widescreen television signal including a first component corresponding to a lower frequency portion of a time-expanded version of said center signal portion relating at least approximately, to said conventional horizontal resolution of said conventional television system and lower frequency portions of time-compressed versions of said left and right signal portions, a second component corresponding to upper frequency portions of said time-compressed versions of said left and right signal portions, and a third component corresponding to an upper frequency portion of said time-expanded version of said center signal portion relating to an enhanced horizontal resolution greater than said conventional horizontal resolution of said conventional television system; and coupling means for coupling said widescreen television signal produced by said camera as modified to said input of said encoder substantially without reduction of its horizontal bandwidth.

2. The television system recited in claim 1, wherein: said aspect ratio modification means comprises an anamorphic optical lens replacing a conventional optical lens normally used with said camera.

3. The television system recited in claim 1, wherein: said aspect ratio modification means comprises electrical means for changing at least one scanning control signal normally generated by said camera for controlling scanning of scenes by said camera.

4. The television system recited in claim 1, wherein: said coupling means includes a video tape recorder normally intended to record said conventional television signal generated by said camera before modification.

5. The television system recited in claim 1, further includes:

frequency content modification means for increasing the high frequency content of said widescreen television signal produced by said camera as modified relative to said conventional television signal produced by said camera before modification.

6. A widescreen enhanced definition television system intended for reproducing images having a greater aspect ratio and a greater horizontal resolution compared with images having a conventional aspect ratio and a conventional horizontal resolution reproduced by a conventional television system operating in conformance with a conventional television transmission standard with conventional transmission channels of a conventional transmission bandwidth, comprising:

a television camera normally intended to generate a television signal having a given number of horizontal lines per field, each of said lines having a given active line interval corresponding to an image with said conventional aspect ratio, and a horizontal bandwidth greater than a conventional horizontal bandwidth corresponding to said conventional horizontal resolution of said conventional television system; said television camera being normally intended to be used in said conventional television system in conjunction with a low pass filter for restricting than said given horizontal bandwidth for filtering said television signal generated by said camera to limit its horizontal bandwidth to said conventional horizontal bandwidth corresponding to said conventional horizontal resolution to produce a conventional television signal conforming to said conventional television transmission standard and suitable for transmission through one of said conventional transmission channels;

an anamorphic lens replacing a conventional lens normally used with said camera so that said television signal generated by said camera is modified to be a widescreen television signal having said given number of horizontal lines per field, each horizontal line having said given active line interval but now corresponding to a widescreen image with an aspect ratio greater than said conventional aspect ratio, and a horizontal bandwidth greater than said conventional bandwidth of said conventional television system; said widescreen television signal having within said given active image interval left side, center and right side signal portions corresponding to left side, center and right side image portions of said widescreen image;

encoder means having an input at which said widescreen television signal produced by said camera as modified is received and an output at which a compatible widescreen television signal suitable for transmission through one of said conventional transmission channels is produced; said compatible widescreen television signal including a first component corresponding to a lower frequency portion of a time-expanded version of said center signal portion relating, at least approximately, to said conventional horizontal resolution of said conventional television system and lower frequency portions of time-compressed versions of said left and right signal portions, a second component corresponding to upper frequency portions of said time-compressed versions of said left and right signal portions, and a third component corresponding to an upper frequency portion of said time-expanded version of said center signal portion relating to an enhanced horizontal resolution greater than said conventional horizontal resolution of said conventional television system; and coupling means for coupling said widescreen television signal produced by said camera as modified to said input of said encoder substantially without reduction of its horizontal bandwidth.

7. The television system recited in claim 6, wherein:
said coupling means includes a video tape recorder normally intended to record said conventional television signal generated by said conventional camera before modification.

8. The television system recited in claim 6, further includes:
frequency content modification means for increasing the high frequency content of said widescreen television signal produced by said camera as modified relative to said conventional television signal produced by said camera before modification.

9. In a widescreen enhanced definition television system intended for reproducing widescreen images having a greater aspect ratio and a greater horizontal resolution and at least the same vertical resolution compared with images having a conventional aspect ratio, a conventional horizontal resolution and a conventional vertical resolution reproduced by a conventional television system operating in conformance with a television standard with conventional transmission channels of a conventional transmission bandwidth, apparatus comprising:

a first input for receiving a first widescreen television input signal corresponding to a widescreen image with a given widescreen aspect ratio greater than said conventional aspect ratio, a first horizontal bandwidth corresponding to a first horizontal resolution greater than said conventional horizontal resolution and a first number of horizontal lines per fields corresponding to a first vertical resolution greater than said conventional vertical resolution;

a second input for receiving a second widescreen television input signal corresponding to a widescreen image with said given widescreen aspect ratio, a second horizontal bandwidth corresponding to a second horizontal resolution greater than said conventional horizontal resolution and a second number of horizontal lines per field corresponding to said conventional vertical resolution;

each of said widescreen television signals having left, center and right signal portions corresponding to left, center and right widescreen image portions;

encoder means having an input at which one of said first and second widescreen television input signals is received and an output at which a widescreen television output signal corresponding to a widescreen image with said given widescreen aspect ratio, a horizontal resolution greater than said conventional horizontal ratio and a vertical resolution depending on the vertical resolution of the received one of said first and second widescreen television input signals and being compatible with said conventional transmission standard and suitable for transmission through only one of said conventional transmission channels; said widescreen television output signal including a first component corresponding to a lower frequency portion of a time-expanded version of said center portion and lower frequency portions of time-compressed versions of said left and right signal portions, a second component corresponding to upper frequency portions of said time-compressed versions of said left and right signal portions, and a third component corresponding to an upper frequency portion of said time-expanded center signal portion;

first coupling means for coupling said first widescreen television input signal to said input of said encoder means without a substantial reduction of said first horizontal bandwidth and with said first number of horizontal lines per field; and second coupling means for coupling said second widescreen television input signal to said input of said encoder means without a substantial reduction of said second horizontal bandwidth but with a substantial reduction of said second number of lines per field.

* * * * *